US012314271B1

(12) United States Patent
Buxton, Jr. et al.

(10) Patent No.: US 12,314,271 B1
(45) Date of Patent: *May 27, 2025

(54) TABLE-DRIVEN SEGMENT SYSTEMS AND METHODS FOR GENERATING PASSENGER INFORMATION MESSAGES

(71) Applicant: AMERICAN AIRLINES, INC., Fort Worth, TX (US)

(72) Inventors: John Emmett Buxton, Jr., Euless, TX (US); Robert R. McCall, Mansfield, TX (US); Muhammad Hafeez, Grand Prairie, TX (US); Cary Castle, Dallas, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,783

(22) Filed: Nov. 27, 2023

Related U.S. Application Data

(63) Continuation-in-part of application No. 17/718,198, filed on Apr. 11, 2022, now Pat. No. 11,829,371, which is a continuation of application No. 16/751,950, filed on Jan. 24, 2020, now Pat. No. 11,301,480.

(51) Int. Cl.
| | |
|---|---|
| *G06F 16/2457* | (2019.01) |
| *G06F 16/22* | (2019.01) |
| *G06F 16/248* | (2019.01) |
| *G06F 16/93* | (2019.01) |
| *G08G 5/26* | (2025.01) |
| *G08G 5/30* | (2025.01) |

(52) U.S. Cl.
CPC .... *G06F 16/24575* (2019.01); *G06F 16/2282* (2019.01); *G06F 16/248* (2019.01); *G06F 16/93* (2019.01); *G08G 5/26* (2025.01); *G08G 5/30* (2025.01)

(58) Field of Classification Search
None
See application file for complete search history.

(56) References Cited

U.S. PATENT DOCUMENTS

| | | | |
|---|---|---|---|
| 11,227,338 B2 * | 1/2022 | Scudder | G06Q 50/14 |
| 11,301,480 B1 * | 4/2022 | Buxton, Jr. | G06F 16/2282 |
| 11,829,371 B1 * | 11/2023 | Buxton, Jr. | G08G 5/30 |
| 12,094,018 B1 * | 9/2024 | O'Malley | G06Q 10/101 |
| 12,141,834 B1 * | 11/2024 | Johnson | G06Q 30/0251 |
| 12,147,386 B2 * | 11/2024 | Alayli | G06F 16/13 |
| 2010/0260426 A1 * | 10/2010 | Huang | G06F 18/217 |
| | | | 707/E17.031 |
| 2018/0308176 A1 * | 10/2018 | Scudder | G06Q 50/14 |
| 2019/0132652 A1 * | 5/2019 | Zhao | H04N 21/8456 |

(Continued)

OTHER PUBLICATIONS

Timestamp Snooping (Year: 2000).*

*Primary Examiner* — Kim T Nguyen
(74) *Attorney, Agent, or Firm* — HAYNES AND BOONE, LLP

(57) ABSTRACT

Passenger information messages ("PIMs") are generated using table-driven segment systems and methods. Message segments may be paired with token names. Passenger information associated with an airline flight are substituted for the token names. The passenger information and message segments are arranged to generate a PIM for the airline flight.

20 Claims, 35 Drawing Sheets

(56) References Cited

U.S. PATENT DOCUMENTS

| | | | |
|---|---|---|---|
| 2023/0007364 A1* | 1/2023 | Zhao | H04N 21/812 |
| 2023/0195694 A1* | 6/2023 | Lion | G06F 16/148 |
| | | | 707/687 |
| 2024/0236660 A1* | 7/2024 | Haziza | H04W 12/088 |

* cited by examiner

APISNextGen for crews

Maintenance ▾  Operations ▾  User's Guide — 53

Msg Table  60 — 65
Show [10 ▾] entries — 85    Search: [    ] — 145  150

| Status | TTY Addr | Ref Nbr | Msg Date Time | Direction | Airline Code | verify Ind | Message | Last Update |
|---|---|---|---|---|---|---|---|---|
| ? | DCAUCCR | 07135900002 | 1805071359 | I | AA | N | QP DCA | |
| ? | HDQAIAA | 07135900003 | 1805071359 | I | AA | N | QP HDQ | |
| ? | DCAUCCR | 07140000004 | 1805071400 | O | AA | N | QP DCA | |
| ? | LONTB7X | 07140000005 | 1805071400 | O | AA | N | QP LON | |
| ? | HDQAIAA | 07140000006 | 1805071400 | O | AA | N | QP HDQ | |
| ? | HAVADCU | 07140000007 | 1805071401 | A | AA | N | QP HAV | |
| ? | FABPTXR | 07140000007 | 1805071401 | A | AA | N | QP FAB | |
| ? | DCAUCCR | 07140100008 | 1805071401 | A | AA | N | QP DCA | |
| ? | HDQAIAA | 07140100009 | 1805071401 | A | AA | N | QP HDQ | |
| ? | DCAUCCR | 07140100010 | 1805071401 | O | AA | N | QP DCA | |

Showing 1 to 10 of 16 entries    Previous [1] 2 Next

— 60, 75, 80, 90, 95, 100, 150, 155, 180, 175, 55, 160, 165, 170

Message for AA0100 from JFK on 21May19 11:10 PM

```
QP LONTBXH
HDQIXAA 212210
UNA*./. -
UNB,UNOA*4,AMERICAN
AIRLINES*AA,USCSAPIS*ZZ,190521*1710,2122100389,APIS-
UNG,PAXLST,AMERICAN
AIRLINES*AA,USCSAPIS*ZZ,190521*1710,1,UN,D*02B-
UNH,190521171,PAXLST*D*02B*UN*IATA,03898-
BGM,250,CI*1.0-
NAD,MS,,,FOS CONTROL-
COM,817.-967.-1848*TE,817.-967.-1145*FX-
TDT,20,AA0100-
LOC,125,JFK-
DTM,189*1905211810*201-
LOC,87,LHR-
DTM,232*1905220620*201-
NAD,FM,,,BERGER*SCOTT*DAVID-
ATT,2,#-
DTM,329*###0604-
LOC,22,LHR-
LOC,178,JFK-
LOC,179,LHR-
LOC,174,USA-
LOC,180,USA,***SYR#####,****NEW YORK-
EMP,1,CR1*110*111-
NAT,2,USA-
DOC,P*110*111,######1076-
LOC,180,USA***ATL#########,****NEW JERSEY-
DTM,36*###0725-
LOC,91,USA-
NAD,FM,,,SCOTT*SHAWN-
```

Fig. 5

APISNextGen for crews

Maintenance ▾   Operations ▾   User's Guide

City Table

Show [10 ▾] entries                                        Search: [      ]

| | IATA City ▵ | ICAO City ⬍ | Country Code ⬍ | Last Update (CDT) ⬍ |
|---|---|---|---|---|
| 🗑 ✏ | BOG | SKBO | COL | 2018-05-02 14:19:40 |
| 🗑 ✏ | CDG | LFPG | FRA | 2018-04-05 10:30:59 |
| 🗑 ✏ | DFW | KDFW | USA | 2017-11-15 07:56:19 |
| 🗑 ✏ | FCO | LIRF | ITA | 2018-05-02 14:20:26 |
| 🗑 ✏ | GRU | SBGR | BRA | 2018-05-02 14:21:24 |
| 🗑 ✏ | DUB | EIDW | IRL | 2018-01-19 10:44:15 |
| 🗑 ✏ | PHL | KPHL | USA | 2018-04-20 15:34:39 |
| 🗑 ✏ | MAD | LECD | ESP | 2018-05-02 14:22:38 |
| 🗑 ✏ | MIA | KMIA | USA | 2018-01-04 09:06:49 |
| 🗑 ✏ | SNN | KSNN | IRE | 2018-01-04 10:36:14 |

Showing 1 to 10 of 12 entries                           Previous [1] 2 Next

[Add New City]

Fig. 11

APISNextGen for crews

Maintenance ▾    Operations ▾    User's Guide

Overfly City Table

Show [10 ▾] entries      Search: [    ]

| | City Pair | Overfly Ind ⇅ | Overfly Country Code ⇅ | Last Update (CDT) ⇅ |
|---|---|---|---|---|
| ✏️ 🗑 | CLTHAV | E | FRA | 2018-04-24 10:36:22 |

Showing 1 to 1 of 1 entries      Previous [1] Next

[Add New City Pair]

Parameter Table — 245

Show [10 ▼] entries                                           Search: [        ]

| Use Indicator | Country Code (2 Char) | Alien Ind | Visa Ind | Passport Ind | Timer 1 | Timer 2 | Timer 3 | Home Addr Ind | Crew Ind | MCL Ind | Closeout Ind | Out Ind | Off Ind | Pilot License Ind | Send Msg Ind | Parameter Code | Last Update (CST) |
|---|---|---|---|---|---|---|---|---|---|---|---|---|---|---|---|---|---|
| ✎ B | AG | N | N | B | 40 | 0 | 0 | N | Y | N | N | N | Y | N | Y | ATG | 14Nov18 3:35 PM |
| ✎ B | AR | N | N | B | 75 | 0 | 0 | N | N | N | N | N | Y | N | Y | ARG | 31Aug18 3:11 PM |

350 { (row 1)
355 { (row 2)

Fig. 14b

Parameter Table — 245

Show [10 ▼] entries                                           Search: [        ]

| Use Indicator | Country Code (2 Char) | Alien Ind | Visa Ind | Passport Ind | Timer 1 | Timer 2 | Timer 3 | Home Addr Ind | Crew Ind | MCL Ind | Closeout Ind | Out Ind | Off Ind | Pilot License Ind | Send Msg Ind | Parameter Code | Last Update (CST) |
|---|---|---|---|---|---|---|---|---|---|---|---|---|---|---|---|---|---|
| B | AG | N | N | B | 40 | 0 | 0 | N | Y | N | N | N | Y | N | Y | ATG | 14Nov18 3:35 PM |
| B | AR | N | N | B | 75 | 0 | 0 | N | N | N | N | N | Y | N | Y | ARG | 31Aug18 3:11 PM |

— 345

Enter APISNG ADMIN Edit Password — 357                    [✕]

Enter Password:

[Password] — 357a

[Clear] — 357b      [Close] — 357c      [Enable] — 357d

| SEGMENT | DESCRIPTION |
|---------|-------------|
| ATT | *TRAVELER GENDER*<br>• A SEGMENT SPECIFYING PASSENGER'S AND/OR CREW ATTRIBUTES SUCH AS COMPLEXION AND BUILD.<br>▶ M - MALE<br>▶ F - FEMALE |
| BGM | BEGINNING OF MESSAGE<br>• A SEGMENT TO INDICATE THE TYPE AND FUNCTION OF THE MESSAGE.<br>▶ BGM+250' - FLIGHT CREW LIST |
| CNT | CONTROL TOTAL<br>• A SEGMENT SPECIFYING CONTROL TOTALS SUCH AS THE TOTAL NUMBER OF PASSANGERS/ CREW MEMBERS IN THE MESSAGE.<br>▶ 41 TOTAL NUMBER OF CREW MEMBERS |
| COM | *REPORTING PARTY CONTACT INFORMATION -*<br>• A SEGMENT TO IDENTIFY COMMUNICATION NUMBERS OF DEPARTMENTS OR PERSONS TO WHOM COMMUNICATION SHOULD BE DIRECTED (e.g., TELEPHONE, FAX NUMBER). THIS SEGMENT USED TO IDENTIFY CONTACT INFORMATION FOR THE PARTY REPORTING PASSENGER/ CREW INFORMATION TO DHS.<br>▶ FX TELEFAX<br>▶ TE TELEPHONE |
| CROn | COMMA SEPARATED VALUE (CSV) FILE<br>• THIS SEGMENT CONTAINS CREW INFORMATION THAT IS TO BE GENERATED FOR A CSV FILE. N REPRESENTS THE LINE NUMBER FOR CREW INFORMATION. FOR EXAMPLE, IF THE FILE ONLY HAS 1 LINE OF INFORMATION FOR EACH CREW MEMBER, THE CR01 WOULD BE THE ONLY SEGMENT DEFINED. |
| DOC | DOCUMENT/MESSAGE DETAILS<br>• A SEGMENT IDENTIFYING PASSENGER AND/OR CREW TRAVEL DOCUMENTS, SUCH AS PASSPORTS, VISAS, ETC.<br>VALID TRAVEL DOCUMENT CODES ARE:<br>SUPPORTED<br>▶ P - PASSPORT<br>▶ L - PILOT'S LICENSE (CREW MEMBERS ONLY)<br>NOT SUPPORTED<br>▶ C,C1 - PERMANENT RESIDENT CARD<br>▶ A - ALIEN REGISTRATION CARD |

TO Fig. 16b

FROM Fig. 16a

Fig. 16b

| | |
|---|---|
| | ▶ M - U.S. MILITARY ID<br>▶ G - U.S MERCHANT MARINER DOCUMENT<br>▶ T, PR, PT - RE-ENTRY PERMIT AND ASYLEE TRAVEL DOCUMENT OR REFUGEE PERMIT<br>▶ IA - EMPLOYMENT AUTHORIZATION CARD WITH THE NOTATIONS "SERVES AS I-512 ADVANCE PAROLE" OR "VALID FOR RE-ENTRY TO THE U.S."<br>▶ I, IN - NEXUS CARD<br>▶ F - FACILITATION DOCUMENT<br>▶ V, VB, VI, VN - U.S. VISA (SECONDARY DOCUMENT ONLY) |
| DTM | DATE/TIME/PERIOD<br>• A SEGMENT TO SPECIFY ASSOCIATED DATES AND/OR TIMES AS REQUIRED RELATED TO LOCATIONS.<br>• A SEGMENT TO SPECIFY ASSOCIATED DATES/TIMES RELATED TO DOCUMENTS.<br>• A SEGMENT TO SPECIFY DATE OF BIRTH<br>   ▶ 189 DEPARTURE DATE/TIME, SCHEDULED (FOR FLIGHT CLOSE-OUT MESSAGES. THIS VALUE WILL REPRESENT THE SCHEDULED DEPARTURE DATE/TIME).<br>   ▶ 232 ARRIVAL DATE/TIME, SCHEDULED<br>   ▶ 329 THE VALUE OF A DATE, A DATE AND TIME, A TIME OR OF A PERIOD IN A SPECIFIED REPRESENTATION.<br>   ▶ 36 THE DTM SEGMENT IS USED TO REPORT THE EXPIRATION DATE ON THE PASSPORT. |
| EMP | EMPLOYMENT DETAILS<br>• A SEGMENT TO INDICATE THE OCCUPATION OF A PASSENGER OR RANK OF CREW.<br>TSA REGULATIONS REQUIRE REPORTING CREW MEMBER TRAVELER TYPE INDICATOR AS FOLLOWS:<br>   ▶ CR1 - COCKPIT CREW AND INDIVIDUALS IN THE COCKPIT<br>   ▶ CR2 - CABIN CREW (e.g. FLIGHT ATTENDANTS)<br>   ▶ CR3 - AIRLINE OPERATION MANAGEMENT WITH COCKPIT ACCESS (e.g. SAFETY INSPECTORS, INSTRUCTORS)<br>   ▶ CR4 - CARGO NON-COCKPIT CREW AND/OR NON-CREW INDIVIDUALS<br>   ▶ CR5 - PILOTS ON AIRCRAFT BUT NOT ON DUTY (DEADHEAD). |

TO Fig. 16c

FROM Fig. 16b

Fig. 16c

| | |
|---|---|
| HDRn | COMMA SEPARATED VALUE (CSV) FILE<br>• THIS SEGMENT CONTAINS HEADER INFORMATION THAT IS TO BE GENERATED FOR A CSV FILE. N REPRESENTS THE LINE NUMBER FOR HEADER INFORMATION. FOR EXAMPLE, GENERALLY HEADER INFORMATION CONTAINS MULTIPLE LINE, SO THERE MAY BY MULTIPLE HDR SEGMENTS DEFINED, i.e. HDR1, HDR2, HDR3, etc. |
| LOC | PLACE/LOCATION IDENTIFICATION<br>• A SEGMENT INDICATING COUNTRY OF BIRTH AND PORT/PLACE OF ORIGIN (EMBARKATION), TRANSIT AND DESTINATION (DEBARKATION) OF A PASSENGER AND/OR CREW.<br>• A SEGMENT TO SPECIFY LOCATIONS SUCH AS PLACE OF DEPARTURE, PLACE OF DESTINATION, COUNTRY OF ULTIMATE DESTINATION, COUNTRY AND/OR PLACE OF TRANSIT, COUNTRY OF TRANSIT TERMINATION, ETC. OF A PASSENGER/CREW.<br>• A SEGMENT INDICATING THE COUNTRY THAT ISSUED THE DOCUMENT<br>▶ 22 AIRPORT OF FIRST U.S. ARRIVAL (INBOUND INTERNATIONAL FLIGHTS)<br>▶ 87 AIRPORT OF INITIAL ARRIVAL IN THE UNITED STATES<br>▶ 125 AIRPORT OF DEPARTURE; LAST NON-U.S. AIRPORT BEFORE THE FLIGHT ARRIVES IN THE U.S.<br>▶ 174 COUNTRY OF RESIDENCE (INBOUND INTERNATIONAL FLIGHTS)<br>▶ 178 PORT OF EMBARKATION<br>▶ 179 PORT OF DEBARKATION<br>▶ 180 PLACE OF BIRTH (CREW MEMBER REPORTING ONLY)<br>▶ 91 THE LOC SEGMENT IS USED TO REPORT THE COUNTRY CODE FOR THE COUNTRY WHERE THE PASSPORT OR PILOT'S LICENSE (FOR CREW) WAS ISSUED. |
| NAD | NAME AND ADDRESS<br>• A SEGMENT SPECIFYING NAME OF THE PASSENGER OR CREW MEMBER.<br>• A SEGMENT TO IDENTIFY THE NAME, ADDRESS AND RELATED FUNCTION.<br>SUPPORTED<br>▶ FM CREW MEMBER<br>NOT SUPPORTED<br>▶ FL PASSENGER |

TO Fig. 16d

FROM Fig. 16c

Fig. 16d

| | |
|---|---|
| | ▶ DDU INTRANSIT PASSENGER<br>▶ DDT INTRANSIT CREW MEMBER<br>▶ COT INVOLVED PARTY - GATE PASS REQUEST<br>▶ ZZZ - FOR CANCEL RESERVATION AND FLIGHT CLOSE-OUT MESSAGES |
| NAD | NAME AND ADDRESS<br>• A SEGMENT SPECIFYING NAME OF THE PASSENGER OR CREW MEMBER. THIS SEGMENT USED TO BEGIN SEGMENT LOOP CONTAINING PASSENGER OR CREW INFORMATION.<br>   ▶ NAD+MS LAST NAME OF PARTY REPORTING TRANSMITTED PASSENGER OR CREW INFORMATION |
| NAT | *TRAVEL CITIZENSHIP*<br>• A SEGMENT TO INDICATE THE NATIONALITY OF A PASSENGER AND/OR CREW. |
| TDT | TRANSPORT INFORMATION<br>• A SEGMENT TO SPECIFY DETAILS OF TRANSPORT RELATED TO EACH LEG, INCLUDING MEANS OF TRANSPORT, MODE OF TRANSPORT NAME AND/OR NUMBER OF VESSEL AND/OR VEHICLE AND/OR FLIGHT. |
| TRLn | COMMA SEPARATED VALUE (CSV) FILE<br>• THIS SEGMENT CONTAINS TRAILER INFORMATION THAT IS TO BE GENERATED FOR A CSV FILE. N REPRESENTS THE LINE NUMBER FOR TRAILER INFORMATION. FOR EXAMPLE, GENERALLY TRAILER INFORMATION CONTAINS MULTIPLE LINES, SO THERE MAY BE MULTIPLE TRL SEGMENTS DEFINED, i.e. TRL1, TRL2, TRL3, etc. |
| UNA | SERVICE STRING ADVICE<br>• THIS SERVICE STRING ADVICE SEGMENT SHALL BEGIN WITH THE UPPER CASE CHARACTERS UNA IMMEDIATELY FOLLOWED BY SIX CHARACTERS IN THE ORDER SHOWN BELOW. THE SPACE CHARACTER SHALL NOT BE USED IN ANY DATA ELEMENT. THE SAME CHARACTER SHALL NOT BE USED IN MORE THAN ONE POSITION OF THE UNA.<br>NOTES: THE USE OF THE UNA SEGMENT IS OPTIONAL FOR THIS IMPLEMENTATION. THE UNA SEGMENT IS USED TO SET DELIMITATION AND CHARACTER SET FOR THE BODY OF THE TRANSMISSION. IF THE UNA IS NOT SENT, THE VALUES SHOWN IN THIS EXAMPLE WILL BE THE ASSUMED DEFAULTS FOR THE ENTIRE MESSAGE SET. |

TO Fig. 16e

FROM Fig. 16d

| | |
|---|---|
| UNB | INTERCHANGE HEADER<br>• TO START, IDENTIFY AND SPECIFY AN INTERCHANGE<br>▶ INTERCHANGE CONTROL REFERENCE |
| UNE | FUNCTIONAL GROUP TRAILER<br>• TO END AND CHECK THE COMPLETENESS OF A FUNCTIONAL GROUP<br>▶ GROUP REFERENCE NUMBER |
| UNG | FUNCTIONAL GROUP HEADER<br>• TO BEGIN A GROUP OF LIKE TRANSACTIONS. ONLY ONE GROUPING OF TRANSACTIONS WILL BE ALLOWED FOR THIS IMPLEMENTATION.<br>▶ GROUP REFERENCE NUMBER |
| UNH | MESSAGE HEADER<br>• A SERVICE SEGMENT STARTING AND UNIQUELY IDENTIFYING A MESSAGE. THE MESSAGE TYPE CODE FOR THE PASSENGER LIST MESSAGE IS PAXLST.<br>▶ MESSAGE REFERENCE NUMBER |
| UNT | MESSAGE TRAILER<br>• A SERVICE SEGMENT ENDING A MESSAGE, GIVING THE TOTAL NUMBER OF SEGMENTS IN THE MESSAGE (INCLUDING THE UNH & UNT) AND THE CONTROL REFERENCE NUMBER OF THE MESSAGE.<br>▶ A SERVICE SEGMENT ENDING A MESSAGE, GIVING THE TOTAL NUMBER OF SEGMENTS IN THE MESSAGE (INCLUDING THE UNH & UNT) AND THE CONTROL REFERENCE NUMBER OF THE MESSAGE.<br>▶ MESSAGE REFERENCE NUMBER |
| UNZ | INTERCHANGE TRAILER<br>• TO END AND CHECK THE COMPLETENESS OF AN INTERCHANGE<br>▶ INTERCHANGE CONTROL REFERENCE |

| TOKEN NAME | USAGE | DESCRIPTION |
|---|---|---|
| {dateNow} | | DATE (YYMMDD) OF PREPARATION OF THE SEGMENT |
| {timeNow} | | TIME (HHMM) OF PREPARATION OF THE SEGMENT |
| {direction} | | ◊I◊ = INBOUND / ◊O◊ = OUTBOUND TO / FROM USA |
| {direction2} | | ◊I◊ = INBOUND / ◊O◊ = OUTBOUND TO / FROM INTERNATIONAL CITY |
| {status} | | APIS MESSAGE FLIGHT STATUS |
| {iataAirlineCode} | | CONTAINS A 2-CHARACTER IATA AIRLINE CODE |
| {icaoAirlineCode} | | CONTAINS A 3-CHARACTER ICAO AIRLINE CODE |
| {fltNum} | | CONTAINS A 4-CHARACTER FLIGHT NUMBER |
| {assignedTail} | | ASSIGNED TAIL NUMBER |
| {depCntry} | | DEPARTURE COUNTRY ISO 3166 3-CHARACTER COUNTRY CODE |
| {depDate} | | DEPARTURE DATE  YYMMDD |
| {depDate2} | | DEPARTURE DATE2  DD-MM-YYYY |
| {depTime} | | DEPARTURE TIME  HHMM |
| {depIATACity} | | 3-CHARACTER DEPARTURE STATION |
| {depICAOCity} | | 4-CHARACTER DEPARTURE STATION |
| {arrCntry} | | ARRIVAL COUNTRY ISO 3166 3-CHARACTER COUNTRY CODE |
| {arrDate} | | ARRIVAL DATE  YYMMDD |
| {arrDate2} | | ARRIVAL DATES  DD-MM-YYYY |
| {arrTime} | | ARRIVAL TIME  HHMM |
| {arrIATACity} | | 3-CHARACTER ARRIVAL STATION |
| {arrICAOCity} | | 4-CHARACTER ARRIVAL STATION |
| {groupReferenceNbr} | | UNIQUE CONTROL NUMBER. MUST MATCH VALUE IN UNE TRAILER |
| {interchangeCntlRef} | | UNIQUE REFERENCE ASSIGNED BY THE SENDER TO AN INTERCHANGE |

Fig. 17b

| TOKEN NAME | USAGE | DESCRIPTION |
|---|---|---|
| {msgReferenceNbr} | | SENDER DEFINED UNIQUE NUMBER (FLIGHTDAYMM) |
| {msgSequenceNbr} | | MESSAGE SEQUENCE NUMBER |
| {fltFirstArrCity} | | FLIGHT'S FIRST ARRIVAL CITY |
| {crewEmployeeNum} | | CREW MEMBER ◇ EMPLOYEE NUMBER |
| {crewPosition} | | CREW MEMBER ◇ CR1 - COCKPIT CR2 - CABIN CR5 ◇ DEADHEAD PILOTS |
| {crewFirstName} | | CREW MEMBER ◇ FIRST NAME |
| {crewMiddleName} | | CREW MEMBER ◇ SECOND GIVEN NAME (OR INITIAL) |
| {crewLastName} | | CREW MEMBER ◇ SECOND GIVEN NAME |
| {crewEmbarkCity} | | CREW MEMBER ◇ CITY WHERE THEY BOARD THE AIRCRAFT |
| {crewDebarkCity} | | CREW MEMBER ◇ CITY WHERE THEY GET OFF THE AIRCRAFT |
| {crewGender} | | CREW MEMBER ◇ M - MALE  F ◇ FEMALE |
| {crewDateOfBirth} | | CREW MEMBER ◇ DATE FORMATTED AS ' YYMMDD ' |
| {crewDateOfBirth2} | | CREW MEMBER ◇ DATE FORMATTED AS DD-MM-YYYY |
| {crewPOBCity} | | CREW MEMBER ◇ CITY OF BIRTH FOR CREW MEMBER |
| {crewPOBState} | | CREW MEMBER ◇ STATE OF BIRTH FOR CREW MEMBER |
| {crewPOBCntry} | | CREW MEMBER ◇ COUNTRY OF BIRTH FOR CREW MEMBER |
| {crewNationality} | | CREW MEMBER ◇ NATIONALITY COUNTRY CODE |
| {crewStAddr} | | CREW MEMBER ◇ RESIDENCE STREET ADDRESS |
| {crewCity} | | CREW MEMBER ◇ CITY OF RESIDENCE |
| {crewState} | | CREW MEMBER ◇ STATE OF RESIDENCE |
| {crewPostalCode} | | CREW MEMBER ◇ ZIP/POSTAL CODE OF RESIDENCE |
| {crewCntryCode} | | CREW MEMBER ◇ COUNTRY OF RESIDENCE (ISO 3166) |
| {crewResidenceCntry} | | CREW MEMBER ◇ RESIDENCE COUNTRY CODE |

Fig. 17c

| TOKEN NAME | USAGE | DESCRIPTION |
|---|---|---|
| {crewPassportNbr} | | CREW MEMBER ◇ PASSPORT NUMBER |
| {crewPassportExpire} | | CREW MEMBER ◇ PASSPORT EXPIRATION DATE YYMMDD |
| {crewPassportExpire2} | | CREW MEMBER ◇ PASSPORT EXPIRATION DATE DD-MM-YYYY |
| {crewPassportIssueDate} | | CREW MEMBER ◇ PASSPORT ISSUE DATE |
| {crewPassportIssueCntry} | | CREW MEMBER ◇ COUNTRY CODE |
| {crewAlienNbr} | | CREW MEMBER - ALIEN REGISTRATION NUMBER |
| {crewAlienExpire} | | CREW MEMBER ◇ EXPIRATION DATE |
| {crewAlienIssueDate} | | CREW MEMBER ◇ ISSUE DATE |
| {crewAlienIssueCity} | | CREW MEMBER ◇ ISSUE CITY |
| {crewAlienIssueCntry} | | CREW MEMBER ◇ ISSUE COUNTRY |
| {crewVisaNbr} | | CREW MEMBER ◇ VISA NUMBER |
| {crewVisaExpire} | | CREW MEMBER ◇ VISA EXPIRATION DATE |
| {crewVisaIssueDate} | | CREW MEMBER ◇ VISA ISSUE DATE |
| {crewVisaIssueCity} | | CREW MEMBER ◇ VISA ISSUE CITY |
| {crewVisaIssueCntry} | | CREW MEMBER ◇ VISA ISSUE COUNTRY |
| {crewLicNbr} | | CREW MEMBER ◇ PILOT◇S LICENSE NUMBER |
| {crewLicIssueCntry} | | CREW MEMBER ◇ ISSUE COUNTRY |
| {cntCNT41} | | TOTAL NUMBER OF ALL CREW MEMBER ON THE FLIGHT |
| {cntUNE} | | THE NUMBER OF MESSAGES IN A FUNCTIONAL GROUP |
| {cntUNT} | | CONTROL COUNT NUMBER OF SEGMENTS IN THE MESSAGE |
| {cntUNZ} | | COUNT EITHER OF THE NUMBER OF |
| {a1} | | ':' TO SEPARATE COMPONENT (SUB-) ELEMENTS WITHIN A COMPOSITE DATA ELEMENT. |
| {a2} | | '+' TO SEPARATE DATA ELEMENTS. |
| {a3} | | '.' TO DEFINE CHARACTER USED AS DECIMAL POINT. |
| {a4} | | ':' RELEASE CHARACTER IS USED TO IMMEDIATELY PRECEDED ANY PREDEFINED DELIMITER |
| {a5} | | '?' COMPONENT DATA ELEMENT SEPARATOR |
| {a6} | | ' ' ' TO IDENTIFY AND DELIMIT THE END OF A SEGMENT |

Destination Address Table

Show [10 ▼] entries                                          Search: [    ]

| | Country Code ⇕ | Country Code 2 ⇕ | Type ⇕ | Address ⇕ | Use Indicator ⇕ | Last Update (CST) ⇕ |
|---|---|---|---|---|---|---|
| ✏ | ARG | AR | T | BUENPXH | B | 10Sep18 4:23 PM |
| ✏ | ATG | AG | T | BGICUXH | B | 29Jun18 1:13 PM |
| ✏ | AUS | AU | S | APIS.UPDATE.SITA_AUS | B | 09Nov18 12:10 PM |

385 / 235 / 390 / 395

APISNextGen for crews

Maintenance ▼    Operations ▼    User's Guide

Event Log Table

Show [10 ▼] entries                                                                 Search: [____]

| Event | Event Code | Event Pgm | Event Desc | Last Update |
|---|---|---|---|---|
| FLT | 14000 | processFutureFlights | APIS: Checking Future Flights (Started) | 2018-05-07 09:44:12 |
| FLT | 14001 | processFutureFlights | Checking Flight AA0072 SYD 2018-04-23 | 2018-05-07 09:44:12 |
| FLT | 14001 | processFutureFlights | Checking Flight AA0080 DFW 2018-04-27 | 2018-05-07 09:44:12 |
| FLT | 14001 | processFutureFlights | Checking Flight AA2678 HAV 2018-04-29 | 2018-05-07 09:44:12 |
| FLT | 14001 | processFutureFlights | Checking Flight AA0017 MIA 2018-04-29 | 2018-05-07 09:44:12 |
| FLT | 14099 | processFutureFlights | Checking Flight AA0073 LAX 2018-04-29 | 2018-05-07 09:44:12 |
| FLT | 14000 | processFutureFlights | APIS: Checking Future Flights (Completed) | 2018-05-07 09:44:12 |
| FLT | 14001 | processFutureFlights | Checking Flight AA0072 SYD 2018-04-23 | 2018-05-07 09:43:11 |
| FLT | 14001 | processFutureFlights | Checking Flight AA0080 DFW 2018-04-27 | 2018-05-07 09:43:11 |

Showing 1 to 10 of 9,401 entries                        Previous [1] 2 3 4 5 ... 941 Next

Fig. 20

OpsHub Event Log Table

Show [10 ▼] entries　　　　　　　　　　　　　　　　　　　　　　　　　　　　Search: [ ]

| Flt Event ◆ | Flt # ◆ | Flt Dep Date (Local) ◆ | Flt Dep City ◆ | Flt Arrival City ◆ | Flt Latest Time Dep (GMT) ◆ | Flt Latest Time Dep (Local) ◆ | Flt Data ◆ | Last Update (CST) ▽ |
|---|---|---|---|---|---|---|---|---|
| IN | 0150 | 2018-11-19 | ORD | CDG | 20Nov18 1:15 AM | 19Nov18 7:15 PM | | 20Nov18 3:26 PM |
| IN | 0106 | 2018-11-19 | JFK | LHR | 20Nov18 1:35 AM | 19Nov18 8:35 PM | | 20Nov18 3:26 PM |
| CREW | 0104 | 2018-11-21 | JFK | LHR | 22Nov18 3:25 AM | 21Nov18 10:25 PM | | 20Nov18 3:25 PM |
| OUT | 0069 | 2018-11-20 | DUB | PHL | 20Nov18 8:55 AM | 20Nov18 9:55 AM | | 20Nov18 3:24 PM |

Fig. 21

Flight Table

Show [10 ▼] entries                                      Search: [      ]

| Processing Group | Flt Dep Date (Local) | Flt # | Flt Dep City | Flt Arr City | Status | Direction | Flt Hub Closeout Ind | Flt Hub Out Ind | Flt Hub Off Ind | Flt Hub On Ind | Flt Hub In Ind | Flt Hub Crew Chg Ind | Flt Latest Time Dep (Local) | Overfly Cntry Code | Last Update (CST) |
|---|---|---|---|---|---|---|---|---|---|---|---|---|---|---|---|
| B | 2018-11-15 | AA0108 | LAX | LHR | A | Outbound | N | N | N | N | N | N | 15Nov18 6:35 PM | | 20Nov18 3:03 PM |
| B | 2018-11-15 | AA0204 | PHL | AMS | A | Outbound | Y | Y | Y | Y | N | N | 15Nov18 9:20 PM | | 20Nov18 3:03 PM |
| B | 2018-11-15 | AA0497 | PHL | MEX | A | Outbound | Y | Y | Y | Y | N | N | 15Nov18 7:35 PM | | 20Nov18 3:03 PM |
| B | 2018-11-15 | AA0728 | PHL | LHR | A | Outbound | Y | Y | Y | Y | N | N | 15Nov18 9:20 PM | | 20Nov18 3:03 PM |

Fig. 22

APISNextGen for crews

Maintenance ▾  Operations ▾  User's Guide

Flight Tracking Table

Show [10 ▾] entries                                                      Search: [    ]

| Status Type | TTY Addr | Date Time | GMT Adj Mins | IATA City | Country Code | Segment Code | Send Msg Ind | Close Ind | Out Ind | Off Ind | On Ind | In Ind | Crew Ind | Close Sent Ind | Out Sent | Off Sent | On Sent | In Sent | Crew Sent | Timer 1 Sent | Timer 2 Sent | Timer 3 Sent | Last Update |
|---|---|---|---|---|---|---|---|---|---|---|---|---|---|---|---|---|---|---|---|---|---|---|---|
| A A | SFTPAUS | 1804302115 | 600 | SYD AUS | AUS | Y | N | N | N | N | N | N | N | 1805071359 | | | | | | | | | |
| D D | DCAUCCR | 1804300610 | -420 | LAX USA | USA | Y | N | N | N | N | N | N | N | 1805071359 | | | | | | | | | |
| H D | HDQAIAA | 1804300610 | -420 | LAX HDQ | USA | Y | N | N | N | N | N | N | N | 1805071359 | | | | | | | | | |
| A A | DCAUCCR | 1804291430 | -240 | MIA USA | USA | Y | N | N | N | N | N | N | N | 1805071359 | | | | | | | | | |
| H A | HDQAIAA | 1804291430 | -240 | MIA HDQ | USA | Y | N | N | N | N | N | N | N | 1805071359 | | | | | | | | | |
| D D | HAVADCU | 1804291315 | -240 | HAV CUB | CUB | Y | N | N | N | N | N | N | N | 1805071359 | | | | | | | | | |
| A A | HAVADCU | 1804291210 | -240 | HAV CUB | CUB | Y | N | N | N | N | N | N | N | 1805071359 1804301929 | | | | | | | | | |
| D D | DCAUCCR | 1804291055 | -240 | MIA USA | USA | Y | N | N | N | N | N | N | N | 1805071359 1804291601 1804291601 | | | | | | | | | |
| H D | HDQAIAA | 1804291055 | -240 | MIA HDQ | USA | Y | N | N | N | N | N | N | N | 1805071359 | | | | | | | | | |
| D D | DCAUCCR | 1804281900 | -300 | DFW USA | USA | Y | N | N | N | N | N | N | N | 1805071359 | | | | | | | | | |

Showing 1 to 10 of 15 entries                                Previous [1] 2 Next

Fig. 23a

APISNextGen for crews

Maintenance ▼ | Operations ▼ | Biz App Admin | About ▼ | Test Tools ▼ | Logout

Flight Tracking Table

Trk Rec Type: [All ▼]   Flight Number: [AA0020, AA00 ▼]   Flt Orig Date: [ ▼ ]   Dep City: [All ▼]   [Search] [Reset]   Search: [ ]

Show [50 ▼] entries

| Trk Id | Rec Type | I/O Status | Flt # | Flt Orig Date | Country Code | Send Msg Ind | Close Ind | Out Ind | Off Ind | Crew Chg Ind | Close Sent Ind | Out Sent (CST) | Off Sent (CST) | On Sent (CST) | In Sent (CST) | Crew Sent (CST) | Timer 1 Sent (CST) | Timer 2 Sent (CST) | Timer 3 Sent (CST) | Last Update (CST) |
|---|---|---|---|---|---|---|---|---|---|---|---|---|---|---|---|---|---|---|---|---|
| 1125706 | H | O | AA0020 | | HDQ | Y | N | N | N | Y | | | | | | 16Aug23 1:59 PM | 16Aug23 3:36 PM | | | 17Aug23 2:01 PM |
| 1125704 | O | O | AA0020 | | USA | Y | N | N | N | Y | | | | | | | | | | 17Aug23 1:58 PM |
| 1125705 | I | I | AA0020 | | GBR | Y | N | N | Y | Y | | | | | | | 17Aug23 3:40 AM | 17Aug23 4:09 AM | 17Aug23 1:10 PM | 17Aug23 1:58 PM |
| 1125707 | O | O | AA0021 | | GBR | Y | N | N | Y | Y | | | | | | | 17Aug23 11:34 AM | 17Aug23 8:01 PM | 17Aug23 1:10 PM | 17Aug23 11:35 AM |
| 1125703 | H | O | AA0024 | | HDQ | Y | N | Y | N | N | | | | | | 17Aug23 8:36 AM | | | 17Aug23 7:25 AM | 17Aug23 8:36 AM |
| 1125712 | O | O | AA0025 | | FRA | Y | N | N | Y | N | | | | | | | | | | |

Msg Table

Status: [All ▼]  Dest Address: [All ▼]  Direction: [All ▼]  Diverted: [Y ▼]  Flt Num: [All ▼]  Flt Orig Date: [2023-08- ▼]  Dep City: [LHR ▼]  Arr City: [All ▼]  [Search] [Reset]  [Top 10 Msgs]

← 700

Show [100 ▼] entries  Search: [_____] ← 705

| Status ⬍ | Dest Addr ⬍ | Ref Nbr ⬍ | Msg Date Time (CST) ⬍ | Direction ⬍ | Flight # ⬍ | Flt Orig Date (Local) ⬍ | Dep City ⬍ | Arr City ⬍ | Total Crew ⬍ | Overfly Ind ⬍ | Cxl Ind ⬍ | Div Ind ⬍ | Last Message ⬍ | Update (CST) ⬍ |
|---|---|---|---|---|---|---|---|---|---|---|---|---|---|---|
| OOOI: ON Event | LONTB7X | 03010966426 1 | 02Aug23 8:09 PM | Outbound | AA0735 | 2023-08-02 | LHR | CLT | 12 | N | N | Y | [View Message] | 02Aug23 8:09 PM |

↑ 249

Showing 1 to 1 of 1 entries  [Resend All Messages] ← 710  Previous [1] Next

Number of days to keep:

[4 ▼]  [Clear Messages]  ☐ Rebuild APIS Message ← 460

Fig. 29

Ops Hub Event Log Table

| Flt Event: | Flt Num: | Flt Orig Date: | Dep City: | Arr City: | | | |
|---|---|---|---|---|---|---|---|
| DIVERSIO ▼ | 0735 | 2023-08- ▼ | LHR ▼ | All ▼ | Search | Reset | Top 10 Msgs |
| 900 | 905 | 910 | 915 | 920 | | 215' | |

Show [50 ▼] entries          Search: [  ]

| Flt Event ◄► | Flight # ◄► | Flt Dep Date (Local) ◄► | Flt Dep City ◄► | Flt Arr City ◄► | Flt Latest Time Dep (GMT) ◄► | Flt Latest Time Dep (Local) ◄► | Flt Data ◄► | Last Update (CST) ◄► |
|---|---|---|---|---|---|---|---|---|
| DIVERSION | 0735 | 2023-08-02 | LHR | CLT | 02Aug23 5:02 PM | 02Aug23 6:02 PM | 2023-08-02T20:10:02 | 02Aug23 3:10 PM |

Showing 1 to 1 of 1 entries        Previous [1] Next

TABLE-DRIVEN SEGMENT SYSTEMS AND METHODS FOR GENERATING PASSENGER INFORMATION MESSAGES

CROSS-REFERENCE TO RELATED APPLICATIONS

This application is a continuation in part of U.S. application Ser. No. 17/718,198, filed Apr. 11, 2022, which is a continuation of U.S. application Ser. No. 16/751,950, filed Jan. 24, 2020, the entire disclosures of which are hereby incorporated herein by reference.

BACKGROUND

The Customs and Border Protection (CBP) agency of the United States of America and other countries' immigration and border agencies require advance information of passengers on an airline flight that will arrive and debark passengers in their country. The advance notice is often a message that is required to be provided in a specific format and containing specific data. Conventional software designed to create and manage the messages rely on command line interfaces that requires action codes to be input by the user to display code and/or instructions that define the message. Due to the reliance on a command line interface, the conventional software requires multiple action codes to be provided in order to edit the format of one message. Moreover, if an incorrect change is made to the code and/or instructions, then the message may not be sent, which may result in fines or other consequences. Moreover, the requirement to input action codes requires a user to be familiar with the specific codes needed.

A software application is needed that uses message template and token substitution methodology to allow for a message template to be defined and the tokens to be substituted with relevant flight and passenger information before being transmitted to the appropriate border agency. A table-driven application allows data elements such as message formats, delivery addresses, message delivery timing, and message content items, which can vary from country to country, to be easily changed without modifying the software application itself.

BRIEF DESCRIPTION OF THE DRAWINGS

FIGS. 4 and 5 are illustrations of windows displayed on the GUI of the computer of FIG. 1, according to an example embodiment.

FIGS. 7-13, 14*a*, 14*b*, and 15 are illustrations of windows displayed on the GUI of the computer of FIG. 1, according to an example embodiment.

FIG. 16*a*-16*e* together form a table of the plurality of tables of FIG. 6, according to an example embodiment.

FIG. 17*a*-17*c* together form another table of the plurality of tables of FIG. 6, according to an example embodiment.

FIGS. 18-22, 23*a*, 23*b*, and 24 are illustrations of windows displayed on the GUI of the computer of FIG. 1, according to an example embodiment.

FIGS. 27-30 are illustrations of windows displayed on the GUI of the computer of FIG. 1, according to an example embodiment.

DETAILED DESCRIPTION

Figure 1:
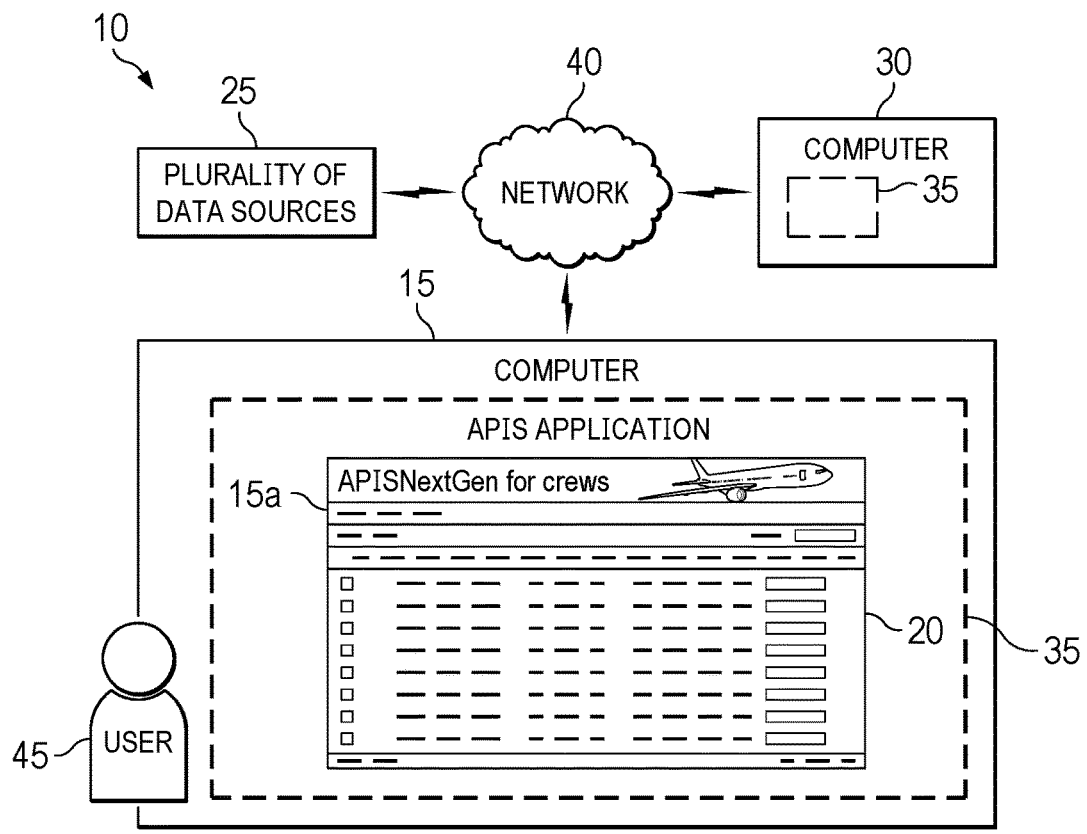
FIG. 1 is a diagrammatic illustration of a table-drive segment and token reporting system according to an example embodiment, the system including a computer comprising a graphical user interface ("GUI") that is configured to display a plurality of windows.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The CBP agency of the United States of America and other countries' immigration and border agencies require advance information of passengers on an airline flight that will arrive and disembark passengers in their country. Generally, the Advance Passenger Information System ("APIS") application provides the passenger information to government agencies. The APIS application creates messages that comply with message format requirements defined in the CBP and the United Nations ("UN") Guidelines of Advance Passenger Information ("API"). Generally, the APIS application uses message template and token substitution methodology that allows a message template to be defined and the tokens substituted with relevant flight and passenger information before being transmitted to the appropriate border agency. The APIS application is table-driven so that data elements such as message format, delivery addresses, message delivery timing, and message content that can vary from country to country can be easily changed without modifying the application and/or code associated with the application.

Conventional systems designed to generate similar messages require a command line interface to open, edit, and save code that generates a message. Not only do conventional systems require entry of commands in a free text entry format, the conventional systems require changing of the code when changes to the message are desired.

In an example embodiment, as illustrated in FIG. 1, a system is generally referred to by the reference numeral 10 and includes a computer 15 that includes a graphical user display ("GUI") 15*a* capable of displaying a window 20; a plurality of data sources 25; a computer 30; and an embodiment 35 of the APIS application (the "APIS application 35"), which is executable on the computer 15 and, in some embodiments, the computer 30 and/or one or more other computers. The computer 15, the plurality of data sources 25, and the computer 30 are operably coupled via a network 40. In some embodiments, a portion of the APIS application 35 is stored in the computer 15 and the APIS application 35 displays the window 20 to a user 45 of the computer 15 via the GUI 15a.

Figure 2:
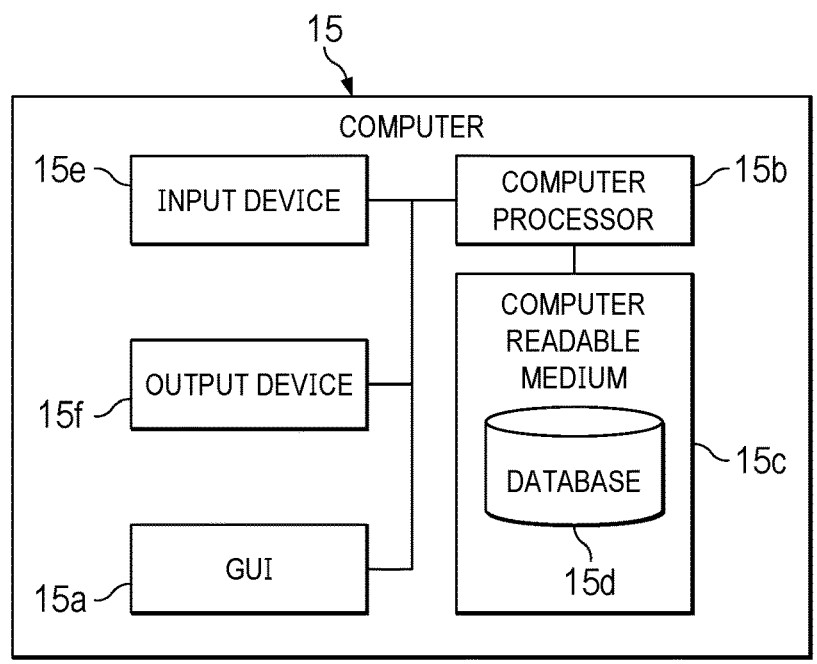
FIG. 2 is a diagrammatic illustration of the computer of FIG. 1, according to an example embodiment.

In an example embodiment, as illustrated in FIG. 2 with continuing reference to FIG. 1, the computer 15 includes the GUI 15a, a computer processor 15b and a computer readable medium 15c operably coupled thereto. Instructions accessible to, and executable by, the computer processor 15b are stored on the computer readable medium 15c. A database 15d is also stored in the computer readable medium 15c. Generally, the GUI 15a can display a plurality of windows to the user. The computer 15 also includes an input device 15e and an output device 15f. In some embodiments, the input device 15e and the output device 15f are the GUI 15a. In some embodiments, the user 45 provides inputs to the system 10 via a window that is displayed on the GUI 15a. However, the input device 15e can also be a microphone in some embodiments and the output device 15f is a speaker. In several example embodiments, the computer 15 is, or includes, a telephone, a personal computer, a personal digital assistant, a cellular telephone or mobile phone, other types of telecommunications devices, other types of computing devices, and/or any combination thereof. In several example embodiments, the computer 15 includes a plurality of remote user devices.

In some embodiments and turning back to FIG. 1, the plurality of data sources 25 includes data sources that include data relating to airline flight plans of users or customers, flight schedules, flight numbers, an origination location and a departure destination for each flight number, passenger data, etc. In one embodiment, the plurality of data sources 25 includes data relating to flight operations. In one embodiment, the plurality of data sources 25 includes data relating to a flight from a plurality of flights, the flight using an airplane and leaving from the departure location and arriving at the destination location. In some embodiments, the plurality of data sources 25 includes a Oshun data source 25a (illustrated in FIG. 3), a Flight Operation Services ("FOS") data source 25b (illustrated in FIG. 3), a Sabre data source and/or application, an Amadeus data source and/or application, and a Mosaic data source and/or application among others.

In an example embodiment, the computer 30 is similar or identical to the computer 15 in that it includes a GUI, a computer processor, and a computer readable medium operably coupled thereto. Instructions accessible to, and executable by, the computer processor are stored on the computer readable medium. A database is also stored in the computer readable medium. Generally, the GUI can display a plurality of windows to the user. The computer 30 also includes an input device and an output device. In some embodiments, the input device and the output device are the GUI.

In an example embodiment, the network 40 includes the Internet, one or more local area networks, one or more wide area networks, one or more cellular networks, one or more wireless networks, one or more voice networks, one or more data networks, one or more communication systems, and/or any combination thereof. In some embodiments, the network 40 also includes WIFI, Bluetooth, and Long-Term Evolution ("LTE") or other wireless broadband communication technology.

In one or more example embodiments, the APIS application 35 or a portion thereof is stored in the computer readable medium 15c of the computer 15, in the computer readable medium of the computer 30, and/or is stored in "the cloud". In some embodiments, the APIS application 35 includes and/or executes one or more web-based programs, Intranet-based programs, and/or any combination thereof. In an example embodiment, the APIS application 35 includes a computer program including a plurality of instructions, data, and/or any combination thereof. In an example embodiment, the application is written in, for example, Hypertext Markup Language (HTML), Cascading Style Sheets (CSS), JavaScript, Extensible Markup Language (XML), asynchronous Javascript and XML (Ajax), iOS, XCode, Swift, Android for mobile, and/or any combination thereof. In an example embodiment, the APIS application 35 pulls real-time information from the plurality of data sources 25 and/or one or more of the computers 15 and 30. In some embodiments, the APIS application 35 is or includes a mobile front-end application downloaded on the computer 15 of the user and a backend application stored or downloaded on the computer 30. Generally, the mobile front-end application communicates with the backend application to display message data regarding the messages created and pushed by the backend application.

Figure 3:
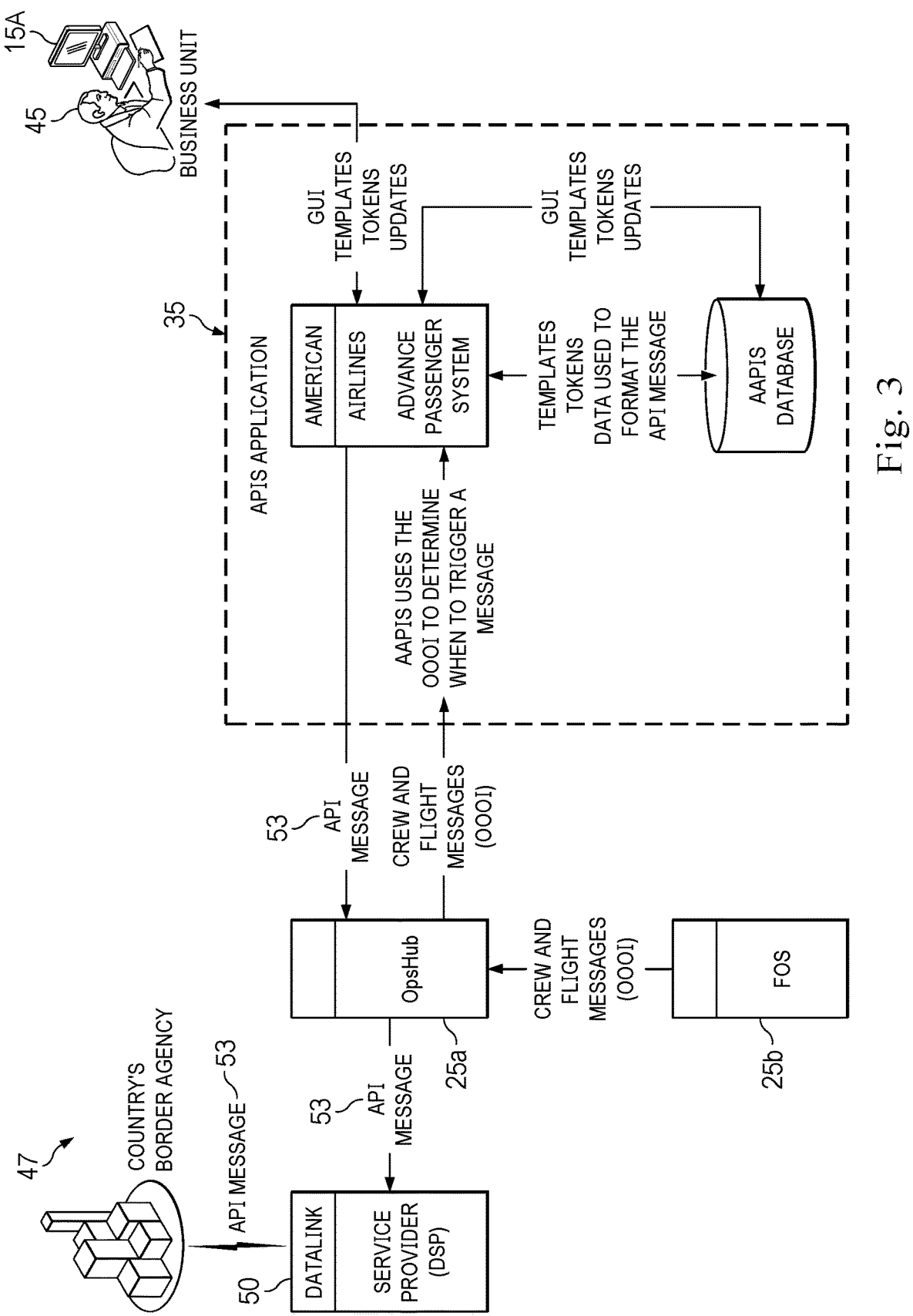
FIG. 3 is a data-flow diagram associated with the system of FIG. 1, according to an example embodiment.

FIG. 3 illustrates one embodiment of a data-flow diagram associated with the system 10. The data-flow diagram is referenced by the numeral 47. In the diagram 47, the OpsHub data source 25a obtains crew information and flight status messages from the FOS data source 25b. In some embodiments, the flight status messages include OUT messages, OFF messages, ON messages, and IN messages, or collectively OOOI messages. In some embodiments, an OUT message is a message that contains the time the flight pulled out of the gate, an OFF message is a message that contains the time the flight took off, an ON message is a message that contains the time the flight landed on the runway, and an IN message is a message that contains the time the flight pulled in to the gate. The OpsHub data source 25a then passes the crew information and OOOI messages to the APIS application 35. The APIS application 35 then uses the crew and flight information to format or generate an API message 53 for a specified country's border agency. Generally, the APIS application 35 uses a template and token information that is stored in an APIS database, which may be one of the plurality of data sources 25. However, in some embodiments, the APIS database is a portion of the database of the computer 30. The API message 53 generated by the APIS application 35 is then sent to the OpsHub data source 25a, along with the destination or delivery address for the API message 53. The OpsHub data source 25a then sends the API message 53 to a Datalink Service Provider ("DSP") 50 via Aircom Server in some embodiments. The DSP 50 then uses the delivery address to deliver the API message 53 to the specified country's border agency. Moreover, the user 45 can use the GUI 15a and the APIS application 35 to maintain, update, or create the APIS database. For example, the user 45 can add a new record, delete an existing record, or update an existing record when the reporting or formatting requirements change and/or when new flight paths are created.

Figure 4:
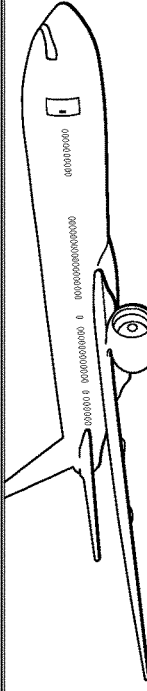

Generally, the user 45 adds, deletes, or alters the APIS database via the APIS application 35, which displays windows on the GUI 15a for the user 45 of the system 10 to easily create, edit, and save instructions regarding the creation and content of API message(s) 53. FIG. 4 is an example of a window 55 displayed by the APIS application 35. The window 55 includes a drop-down menu 60 titled "Maintenance"; a drop-down menu 65 titled "Operations"; and a table portion 70 titled "Msg Table." The "Msg" portion 70 includes columns titled "Status" 75; "TTY Addr" 80; "Ref Nbr" 85; "Msg Date Time" 90; "Direction" 95; "Airline Code" 100; "Flight #" 105; "Dep Date Time" 110; "Dep City" 115; "Dep Cntry Code" 120; "Arr Date Time" 125; "Arr City" 130; "Arr Cntry Code" 135; "Total Crew" 140; "Overfly Ind" 145; "Message" 150; and "Last Update" 155. In some embodiments, the "Status" column 75 is associated with a status of an API message; the "TTY Addr" column 80 is associated with a teletype destination address; the "Ref Nbr" column 85 is associated with an APIS generated reference number; the "Msg Date Time" column 90 is associated with a date and time that the API message was generated; the "Direction" column 95 is associated with the flight direction (e.g., inbound to USA or outbound from USA); the "Airline Code" column 100 is associated with a two-character IATA airline code; the "Flight #" column 105 is associated with a four-character flight number; the "Dep. Date Time" column 110 is associated with the flight departure date and time; the "Dept City" column 115 is associated with the three-character IATA departure city code; the "Dept Cntry Code" column 120 is associated with the ISO 3166 three-character departure country code; the "Arr Date Time" column 125 is associated with the flight arrival date and time; the "Arr City" column 130 is associated with the three-character IATA arrival city code; the "Arr Cntry Code" column 135 is associated with the ISO 3166 three-character arrival country code; the "Total Crew" column 140 is associated with the total number of crew members of the flight; the "Overfly Ind" column 145 is associated with an indicator if the message is an overfly API message; the "message" column 150 is associated with the API message; and the "Last Update" column 155 is associated with the date and time that the record was last updated. The "Msg Table" portion 70 also includes rows, with each row such as row 160, 165, and 170, being associated with a flight. In some embodiments, each row also includes a selectable "generate message" icon such as icon 175 and a selectable "message" link such as link 180 that is within the "message" column 150.

Generally, the window 55 provides a status update to the user 45 regarding the status of an API message that is sent for each flight. FIG. 5 illustrates an example of the API message 53. In some embodiments, the API message 53 forms a portion of the window 55 in response to one of the selectable "message" links, such as the link 180, being selected by the user 45.

Figure 6:
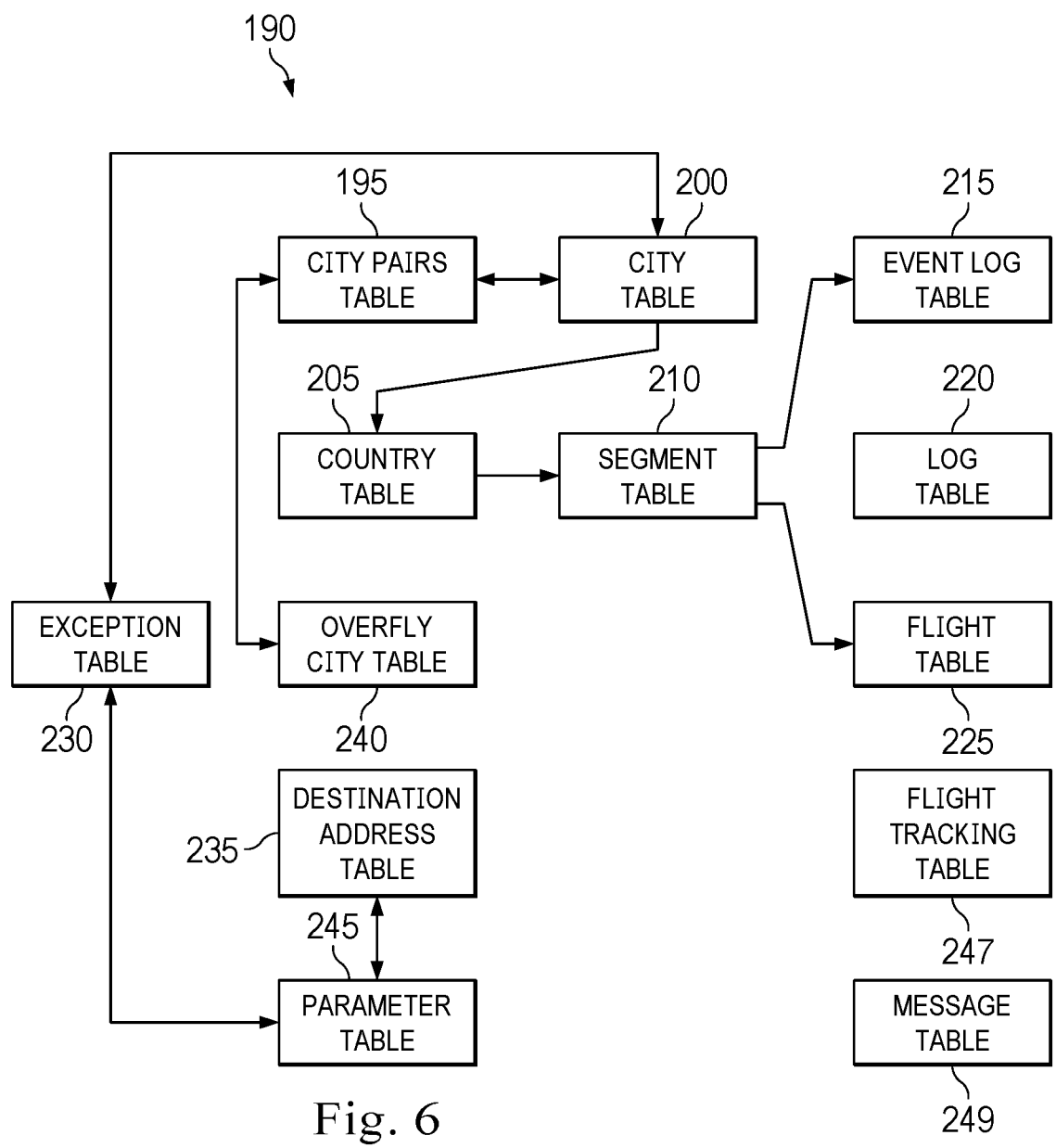
FIG. 6 is an illustration of a plurality of tables referenced by the system of FIG. 1, according to an example embodiment.

The API message 53 includes message content and is created using message instructions. Generally, the message content includes message segments paired with a portion of passenger information. In some embodiments, the message segments include template text that is used to identify portions of the passenger information. For example, the portion of the message 53 of "LOC, 178, JFK" includes template text of "LOC", which identifies following data as data associated with a place/location, such as "178" being a port of embarkation and "JFK" being the embarkation location. Moreover, the portion of the message 53 of "NAD, FM . . . SCOTT*SHAWN-" includes template text of "NAD", which identifies following data as data associated with a name and address and "FM . . . SCOTT*SHAWN-" being a partial name and partial address. Generally, the message instructions include message delivery instructions that include addresses or recipient addresses, events that trigger the creation and sending/transmission of a message, and instructions regarding the timing of the message. In some embodiments, the message instructions are different for different flights. As such, the APIS application 35 manages instructions for a large number of flights and formats different types of messages based on the different instructions. The APIS application 35 uses a table-driven method of generating the API messages, and each API message is generated using a plurality of tables. An illustration of a plurality of tables 190 is illustrated in FIG. 6. In some embodiments, the plurality of tables 190 includes a City Pairs Table 195, a City Table 200, a Country Table 205, a Segment Table 210, an Event Log Table 215, a Log Table 220, a Flight Table 225, an Exception Table 230, a Destination Address Table 235, an Overfly City Table 240, a Parameter Table 245, a Flight Tracking Table 247, and a Message Table 249. In some embodiments, one table in the plurality of tables 190 references or points to data in another table in the plurality of tables 190. As such, at least one table in the plurality of tables 190 is mapped to another table in the plurality of tables 190. In some embodiments, a portion of the plurality of tables 190 are editable by the user 45 via the APIS application 35 and another portion of the plurality of tables 190 cannot be edited by the user 45 via the APIS application 35.

In some embodiments, the portion of the plurality of tables 190 that are editable by the user 45 includes the Exception Table 230, the City Table 200, the Country Table 205, the Overfly City Table 240, the Parameter Table 245, the Segment Table 210, and the Destination Address Table 235. Each table is accessible via the "Maintenance" drop-down menu 60, as illustrated an enlarged portion of the window 55 depicted in FIG. 7.

Figures 7, 8:
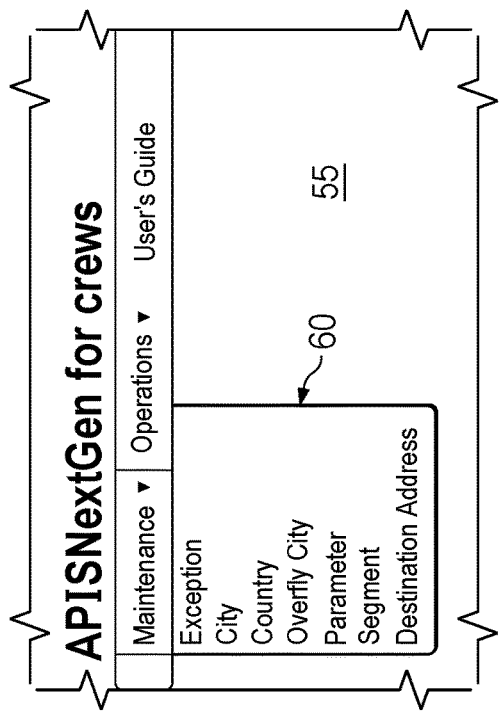

In some embodiments, the Exception Table 230 is a table that allows the user to define special processing by CBP for flights arriving from selected international destinations. When "Exception" is selected from the "Maintenance" drop-down menu 60, a window 255 is displayed to the user 45 detailing the existing exceptions as illustrated in FIG. 8. The window 255 displays the Exception Table 230, which as illustrated, includes a first exception 260 and a second exception 265. The first exception 260 is associated with a "City Pair" of "DUBPHL", a "Dept City Parameter Code" of "IRL", an "Arr City Parameter Code" of "USA1", and a "Last Update (CST)" of "27Jun18 11:28 AM." The second exception 265 is associated with a flight "City Pair" of "SNNPHL", a "Dept City Parameter Code" of "IRL", an "Arr City Parameter Code" of "USA1", and a "Last Update (CST)" of "19Sep18 4:01 PM." In some embodiments, the CBP has a default request or message instruction that an API message be generated 60 minutes, or other target transmission time, before the scheduled departure time for all flights departing or arriving in the USA. As such, a default message instruction is that each API message is generated and transmitted 60 minutes before departure for all international flights departing from the USA or arriving in the USA. However, in some embodiments, there are instances when target transmission time is different from 60 minutes before departure. For example, and in some embodiments, Ireland preclears the crew members. But the crew arrives at the airport 90 minutes before departure. CBP does not have their API information until 60 minutes before departure. The Exception Table 230 allows the user 45 to define special processing for Ireland so that an API message is generated 120-minutes prior to flights departing Dublin (DUB) or Shannon (SNN). The Exception Table 230 assigns a "Parameter Code" that is to be used for CBP for specific cities or city pairs. In some embodiments, the Parameter Code associated with a city is different from a country code of the country in which the city is in. For example, and for Dublin, the country code of the country (Ireland) in which the city (Dublin) is in may be Ireland ("IRL") but the Parameter Code may be USA1. As discussed below, the APIS application 35 references the Parameter Code to determine target transmission time of the message. As illustrated, the first exception 260 is associated with a flight from DUB to PHL. When the APIS application 35 processes the DUB PHL flight, the APIS application 35 checks the Exception Table 230 to determine if the one or more of cities are in the Exception Table 230. If the city is not found, then the APIS application 35 takes no action and the default message parameter of 60 minutes is used because the Parameter Code is the same as the Country Code. If the city is found, then the APIS application 35 uses the Parameter Code associated with the city or city pair for the flight. As such, the end result is DUB continues to use IRL as its country code, but PHL now has the parameter code USA1, which is associated with a target transmission time of 120 minutes before departure.

Generally, a portion of the tables in the plurality of tables 190, such as the Exception Table 230, allows for data to be added, altered, or deleted by the user 45 and includes an "Update" column 270 with a pencil icon in each row. Selecting this icon brings up a pre-populated modal which allows the user 45 to alter values for most data associated with each listing. Generally, the user 45 cannot alter values used as primary keys in the database. Once the "Update" button is selected from the "Update" column 270, the record or listing will be altered in the APIS database with the new changes. In some embodiments, a portion of the tables in the plurality of tables 190, such as the Exception Table 230, also includes a "Delete" column 275 with a trash can icon in each row. Individual listings or records associated with a row can be deleted by clicking on the trash can icon to the left of the window 255.

Figure 9:
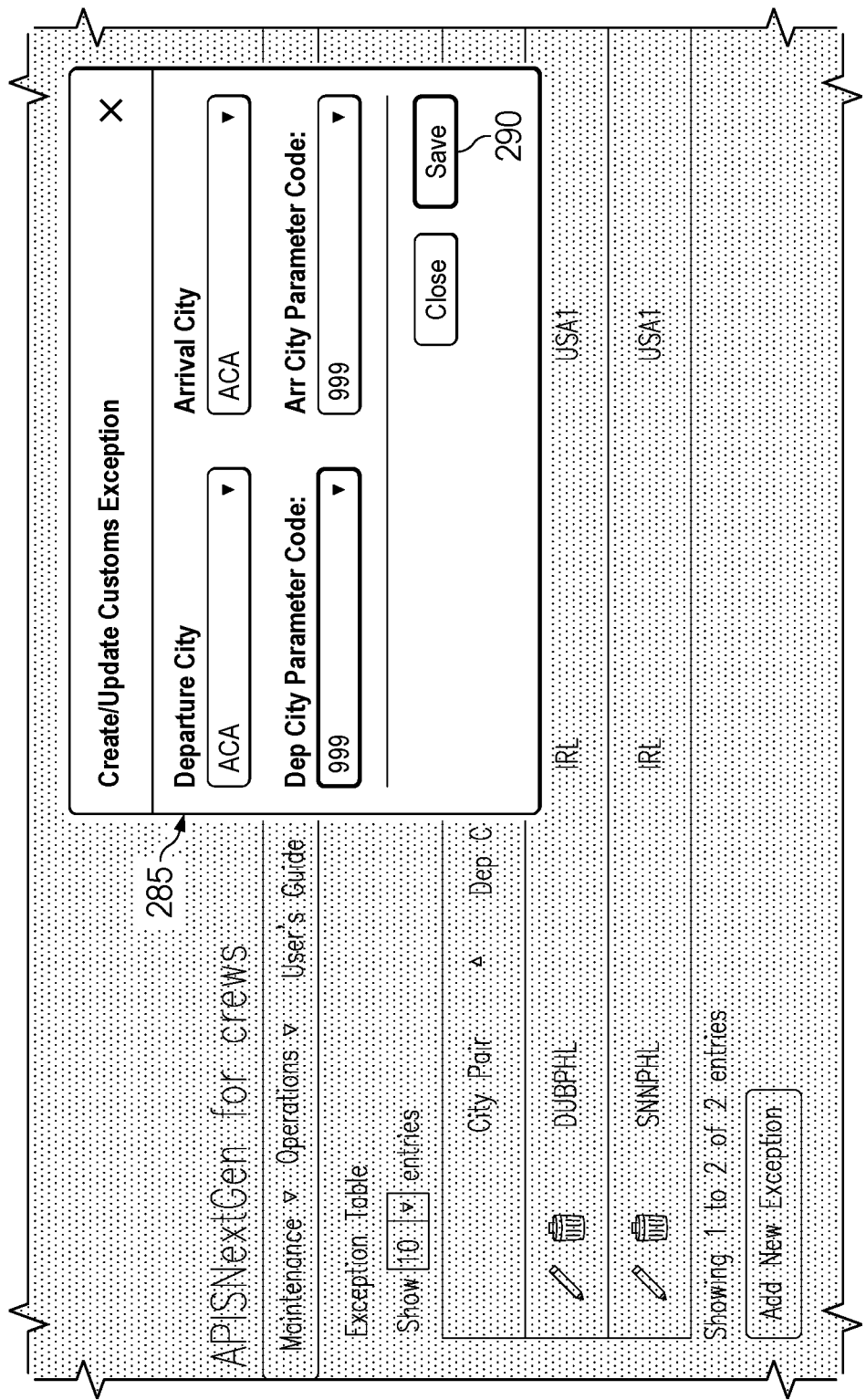
Figure 10:
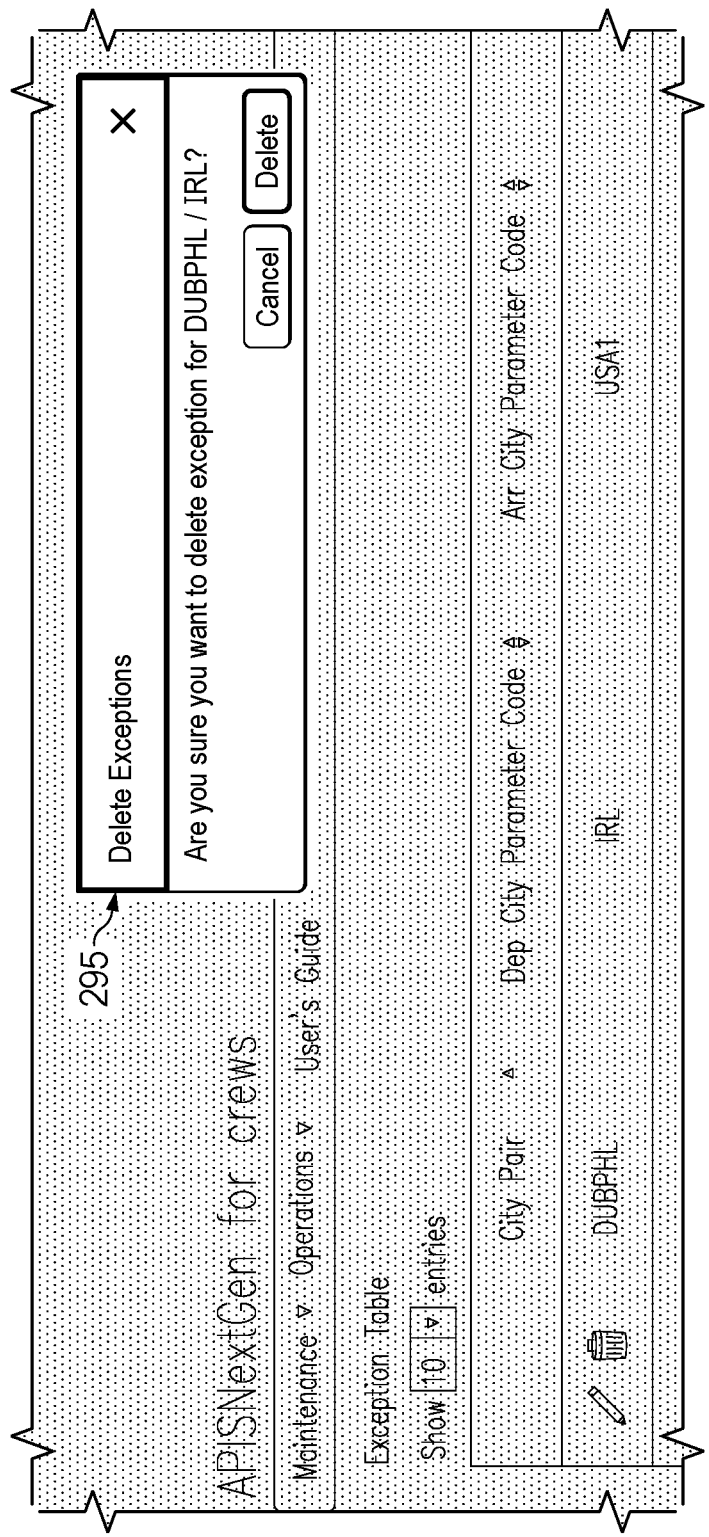

In some embodiments, a portion of the tables in the plurality of tables 190, such as the Exception Table 230, also includes an "Add" button 280. When the user 45 wants to add a listing or an exception to the Exception Table 230, the user selects the "Add" button 280 and, as illustrated in FIG. 9, a window 285 is displayed on the GUI 15a. In some embodiments, the window 285 includes user interface elements that request and receive exception data that includes a departure city, an arrival city, a departure city parameter code, and an arrival city parameter code. Generally, the departure city is a three-character IATA city code and the arrival city is a three-character IATA city code. In some embodiments, the user interface elements include a drop-down menu, text box, checkbox, selectable buttons, toggle switch, a "start typing . . . " solution where the list of filtered options is displayed after the first one or two letters, a stepper that allows a user to increase or decrease a number value with a tap or click, a sliding scale or slider, a date picker, etc. Generally, a toggle is a user interface element that is a switch between one choice and another. As such, the toggle is a user interface element that is a binary-type switch. After entering the exception data, the user selects a "Save" button 290, and the exception is saved to the Exception Table 230. Referring back to FIG. 8, when the user 45 wants to update an exception in the Exception Table 230, the user 45 selects the pencil icon in the column 270 in the Exception Table 230 and enters or edits the exception data via the user interface elements on the window 285. In some embodiments and when the user 45 is updating an existing exception, the window 285 omits the "Save" button 290 and instead a selectable "Update" button is displayed. Selecting the "Update" button will update the exception data stored in the Exception Table 230. When the user 45 wants to delete an existing exception that is within the Exception Table 230, the user 45 selects a delete button or icon that is displayed in the column 275 on the window 255. In response to the indication that the delete button has been selected, the APIS application 35 displays a window 295 as illustrated in FIG. 10. The window 295 requests confirmation that the exception or listing is to be deleted and includes a selectable "delete" button. In response to the indication that the delete button has been selected, the APIS application 35 deletes the selected exception from the Exception Table 230.

In some embodiments, the City Table 200 is a table that allows the user 45 to associate a city to a country code. The city can be in a foreign country or a domestic city in the United States. For example, if an API message needed to be generated for flights between DUB and PHL, both Dublin and Philadelphia would need a record in the City Table 200. Returning back to FIG. 7 and when "City" is selected from the "Maintenance" drop-down menu 60, a window 305 is displayed to the user 45 detailing the existing city listings as illustrated in FIG. 11. The window 305 displays the City Table 200 or a portion thereof, which as illustrated, includes a listing of cities, such as a listing for BOG 310, CDG 315, etc. The listing for BOG 310 is associated with IATA City of "BOG", a "ICAO City" of "SKBQ", an "Country Code" of "COL", and a "Last Update (CST)" of "2018-05-02 14:19." Generally, the IATA City is a three-character IATA city code for the city, the ICAO is the four-character ICAO city code for the city and the Country code is the ISO 3361 three-character country code that denotes the country code that is to be used for the city. The window 305 also includes the update button, the delete button, and the add button, which are used to update, delete, and add a city to the City Table 200 in a similar manner to updating, deleting, and adding an exception as described above.

Figure 12:
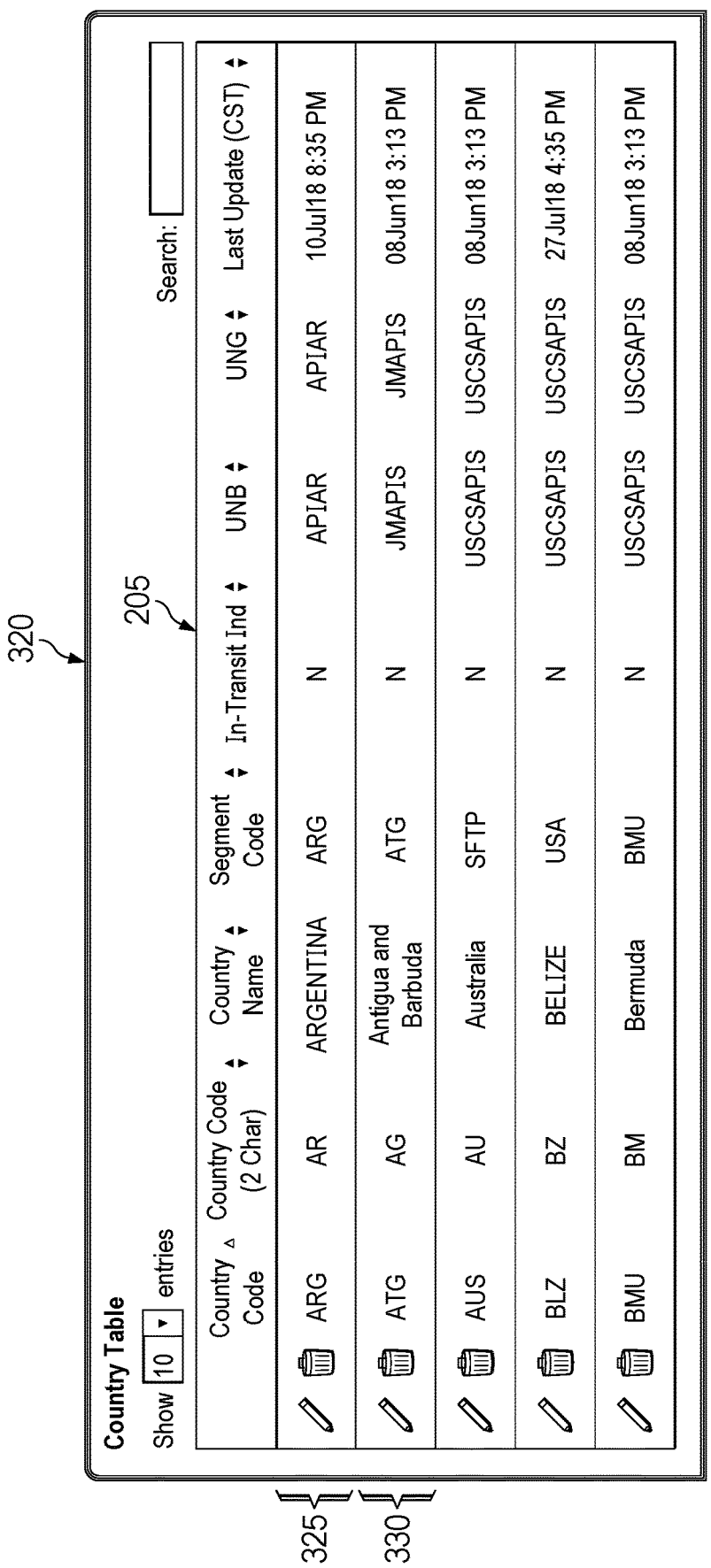

In some embodiments, the Country Table 205 is a table that allows the user 45 to associate a country code with a segment code. When "Country" is selected from the "Maintenance" drop-down menu 60, a window 320 is displayed to the user 45 detailing the existing country code listings as illustrated in FIG. 12. The window 320 displays the Country Table 205, which as illustrated, includes a listing of country codes, such as a listing for ARG 325, ATG 330, etc. The listing for ARG 325 is associated with "Country Code" of "ARG"; "Country Code (2 Char)" of "AR"; "Country Name" of "Argentina"; "Segment Code" of "ARG"; "In Transit Ind" of "N"; "UNB" of "APIAR"; "UNC" of "APIAR"; and "Last Update" of "10Jul18 8:35 PM." Generally, the Country code is the ISO 3361 three-character country code that denotes the country code; the "Country Code (2 Char)" is the ISO 3361 two-character country code that denotes the country code; the "Country Name" is a country name; the "Segment Code" defines the segment code to be associated with the country; the "In Transit Ind" is the in transit indicator, with Y meaning that the crew is in transit (i.e., it is a turn flight for the crew instead of a final destination for the crew) and N meaning that the crew disembarks at the destination city; the "UNB" is a thirty-five character recipient ID; and the UNG is a thirty-five character interchange recipient ID. The window 320 also includes the update button, the delete button, and the add button, which are used to update, delete, and add listing in a similar manner to updating, deleting, and adding a listing as described above.

In some embodiments, the Overfly City Table 240 is a table that allows the user to define a city pair that requires the generation of an API message. When "Overfly City" is selected from the "Maintenance" drop-down menu 60, a window 335 is displayed to the user 45 detailing the existing listings as illustrated in FIG. 13. The window 335 displays the Overfly City Table 240, which as illustrated, includes a listing of city pairs, such as a listing for CLTHAV 340. The listing for CLTHAV 340 is associated with "City Pair" of "CLTHAV"; "Overfly Ind" of "E"; "Overfly Country Code" of "FRA"; and a "Last Update." Generally, the "City Pair" is a three-character IATA departure city plus a three-character IATA arrival city; the "Overfly Ind" is an indication whether the API message is to be generated and is generally an E (i.e., enable or yes "Y") or is an D (i.e., disable or no "N"); and the "Overfly Country Code" is the ISO 3361 three-character country code that denotes the overfly country code. The window 335 also includes the update button, the delete button, and the add button, which are used to update, delete, and add a listing to the table in a similar manner to updating, deleting, and adding a listing as described above.

In some embodiments, the Parameter Table 245 is a table that allows the user 45 to associating parameters for each country code. In some embodiments, the parameters provide instructions regarding the target transmission time, format, and content of an API message associated with different country codes. Generally, each country code has two parameter records, with one for flights outbound from the USA and one for flights inbound into the USA. However, a country may have only one parameter record when the parameters are the same for inbound and outbound flights. When "Parameter" is selected from the "Maintenance" drop-down menu 60, a window 345 is displayed to the user 45 detailing the existing parameters for countries as illustrated in FIG. 14a. The window 345 displays the Parameter Table 245, which as illustrated, includes a listing of country codes and associated parameters, such as a listing for AG 350, AR, 355, etc. The listing for AG 350 is associated with a "Use Indicator" of "B"; a "Country Code (2 Char)" of "AG"; "Alien Ind" of "N"; "Visa Ind" of "N"; "Passport Ind" of "B"; "Timer 1" of 40; "Timer 2"; of 0; "Timer 3" of 0; "home Addr Ind" of "N"; "Crew Ind" of "Y"; "MCL Ind" of "N"; "Closeout Ind" of "N"; "out Ind" of "N"; "Off Ind" of "Y" "Pilot License Ind" of "N"; "Send Msg Ind" of "Y"; "Parameter Code" of "ATG"; and a "Last Update." Generally, the "Use Indicator" is either outbound ("O"); inbound ("I"); or both ("B") and specifies if the parameter applies to outbound flights, inbound flights, or both. The "Country Code (2 Char)" is a two-character country code; "Alien Ind" is either N or Y to indicate whether if the crew member's alien resident information is to be included in the API message; "Visa Ind" is either N or Y to indicate whether crew member's visa information is to be included in the API message; "Passport Ind" is either O, I, or B to indicate whether the crew member's passport information is to be included in the API message"; "Timer 1" is the number of minutes prior to scheduled departure to send an API message; "Timer 2" is the number of minutes prior to scheduled departure to send an API message; "Timer 3" is the number of minutes prior to scheduled departure to send an API message; "home Addr Ind" is either Y or N to indicate if the crew member's home address is to be included in the API message; "Crew Ind" is either Y or N to indicate if a crew change event will generate an API message; "MCL Ind" of either Y or N to indicate if a master crew list is to be included in the API message; "Closeout Ind" of either Y or N to indicate if a closeout event will generate an API message; "Out Ind" of either Y or N to indicate if an OUT event will generate an API message; "Off Ind" of either Y or N to indicate if an OFF event will generate an API message; "Pilot License Ind" of either Y or N to indicate if a pilot's license information is to be included in the API message; "Send Msg Ind" of either Y or N to indicate if the API message is to be sent; "Parameter Code" is the parameter code associated with the listing or row; and a "Last Update."

The window 345 also includes the update button, the delete button, and the add button, which are used to update, delete, and add a listing to the table in a similar manner to updating, deleting, and adding a listing as described above. In some embodiments, the Parameter Table 245 is password protected such that the update button, the delete button, and the add button, are only viewable or accessible after a user provides a password via a security prompt 357 as illustrated in FIG. 14b. The Parameter Table 245 is not the only table or window that may be password protected and any of the tables or windows disclosed herein may be password protected or require similar security clearance before a user may delete, add, or otherwise alter a table. In some embodiments, the security prompt 357 includes a text entry box 357a configured to receive a password, a selectable "clear" button 357b that is selectable to clear the entered password, a selectable "enable" button 357c that is selectable to enable or save the edits, and a selectable "close" button 357d to close the security prompt. In some embodiments, the security prompt 357 restricts updates to sensitive tables to ensure no one can corrupt the time values, for example in the Parameter Table 245, that could cause the APIS application 35 to not send a crew manifest alert at the appropriate time or not at all without notice.

Figure 15:
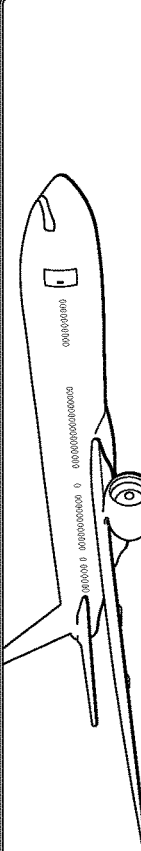

In some embodiments, the Segment Table 210 is a table that allows the user 45 to define the segments and data to be used to build the API message 53. When "Segment" is selected from the "Maintenance" drop-down menu 60, a window 360 is displayed to the user 45 detailing the segments to be used to build the API message 53 as illustrated in FIG. 15. The window 360 displays the Segment Table 210, which as illustrated, includes a listing of segment templates, such as templates 365, 370, etc. Each template is associated with a "Seg Code"; a "Seg Type"; a "Seg Category"; a "Seg Tag"; a "Ordering"; a "Ind CNT41"; an "Ind UNE"; an "Ind UNT"; a "Ind UNZ", a "Seg Template"; and a "Last Update." Generally, the "Seg Code" is a user defined segment code; the "Seg Type" is an API message segment type (e.g., HDR, MSG, CR1, CR1, CR2, TRL); the "Seg Category" is a message segment category (e.g., H, M, C, T); the "Seg Tag" is a API message segment identifier; the "Ordering" is a value defined by the user to ensure that the message segments are built in the correct order; the "Ind CNT41" is either a 0 or 1 and indicates that the segment should increment the crew count; the "Ind UNE" is either a 0 or 1 and indicates that the segment should increment the UNE group segment count; the "Ind UNT" is either a 0 or 1 and indicates that the segment should increment the UNT message segment count; the "IND UNZ" is either a 0 or 1 and indicates that the segment should increment the UNZ interchange segment count; and the "Seg Template" contains the message segment with the substitution tokens. In some embodiments, the Seg Tag and/or the Ordering are position identifiers for the listing or message segment. The window 360 also includes the update button, the delete button, and the add button, which are used to update, delete, and add a listing to the table in a similar manner to updating, deleting, and adding a listing as described above. As illustrated, each of the templates illustrated in Table 210 include a "Seg Type" of "HDR" and a "Seg Tag" of HDR0, HDR1, HDR2, etc. Generally, the segment tag "HDRn" indicates header information that is to be generated for a comma separate value ("CSV") file. Generally, header information contains multiple lines with HDR0 indicating first line header information, HDR1 indicating second line header information, etc. The segment template having a segment tag of "HDR9" that has the "*DEP TIME, {depTime} . . . , indicates that the tenth line of header will include the text "DEP TIME" and next to the text "DEP TIME", the information associated with the token name "{depTime}" will be displayed. The information associated with the token name "{depTime}" is departure time in HHMM format. Generally, the information associated with a token is accessed via one of the plurality of data sources 25. FIGS. 16a-16e together form a table 375 that lists examples of segment tags and a description for each. FIGS. 17a-17c together form a table 380 that lists examples of token names and descriptions.

Figures 18, 19:
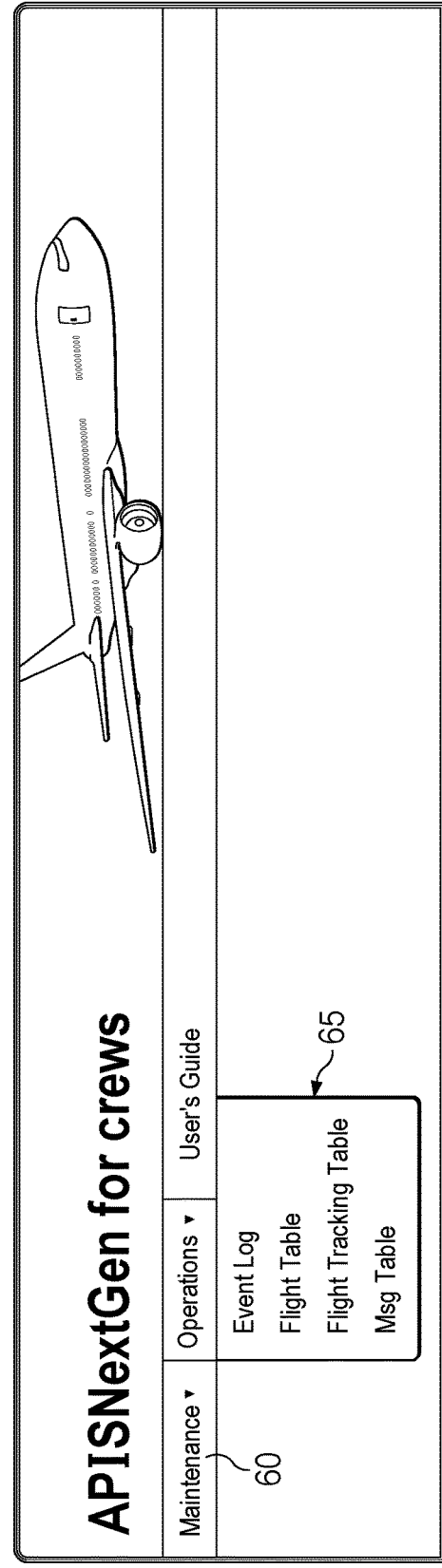

In some embodiments, the Destination Address Table 235 is a table that allows the user 45 to define teletype addresses for countries requiring delivery of the messages to multiple locations. When "Destination Address" is selected from the "Maintenance" drop-down menu 60, a window 385 is displayed to the user 45 detailing the destination addresses as illustrated in FIG. 18. The window 385 displays the Destination Address Table 235, which as illustrated, includes a listing of country address records, such as records 390, 395, etc. Each record is associated with a "Country Code"; a "Country code2"; a "Type"; an "Address"; a "Use Indicator"; and a "Last Update." Generally, the "Country Code" is the IOS 3166 three-character code requiring additional delivery of messages; the "Country Code" is the IOS 3166 two-character code requiring additional delivery of messages; the "type" is either a teletype ("T") or file transfer ("F"); the "Address" is the seven character teletype address; and the "Use Indicator" indicates if the messages are to be generated for inbound flights ("I"), outbound flights ("O"); or both ("B"). The window 385 also includes the update button, the delete button, and the add button, which are used to update, delete, and add a listing to the table in a similar manner to updating, deleting, and adding a listing as described above.

As illustrated in FIG. 19, the drop-down menu 65 titled "Operations" allows the user 45 to view tables that are generally unalterable by the user 45. That is, the tables are for viewing only and cannot be altered. One example of a table in the "Operation" drop-down menu is "Event Log". When "Event Log" is selected from the "Operations" drop-down menu 65, a window 400 is displayed to the user 45 that includes the Event Log Table 215 as illustrated in FIG. 20. Generally, the Event Log Table 215 includes a listing of events, such as event 405, 410, etc. Each event is associated with an "Event"; an "Event Code"; a "Event Pgm"; an "Event Desc"; and a "Last Update." Generally, the "Event" is a type of event being logged; the "Event Code" is an event code; the "Event Pgm" is a program or method that logged the event; and the "Event Desc" is a description of the event.

Another example of an event log that is accessed via the "Event Log" option is the OpsHub Event Log Table 215', which is displayed in a window 415 of FIG. 21. The window 415 displays the OpsHub Event Log Table 215', which as illustrated, includes a listing of events, such as event 420, 425, etc. Each event is associated with a "Flt Event"; a "Flt #"; a "Flt Dep Date (Local)"; a "Flt Dep City"; a "Flt Arr City"; a "Flt Latest Time Dept (GMT)"; a "Flt Latest Time Dep (Local)"; "Flt Data"; and a "Last Update." Generally, the "Flt Event" is the type of event being logged; the "Flt #" is the flight number; the "Flt Dep Date (Local)" is the flight departure date in local time; the "Flt Dep City" is the flight departure city; the "Flt Arr City" is the flight arrival city; the "Flt Latest Time Dept (GMT)" is the flight latest time departure at GMT; and the "Flt Latest Time Dep (Local)" is the flight latest time departure in local time.

In some embodiments and as illustrated in FIG. 22, the Flight Table 225 is a table that contains a list of flights being processed by the APIS application 35. When "Flight" is selected from the "Operations" drop-down menu 65, a window 430 is displayed to the user 45 detailing the flights being processed by the APIS application 35. Generally, the Flight Table 225 includes a listing of flights being processed by the APIS application 35 such as for example flight 435 and 440. Each listing is associated with a "Processing Group"; a "Flt Dep Date (Local)"; a "Flt #"; a "Flt Dep City"; a Flt Arr City "; a Status"; a "Direction"; a Flt Hub Closeout Ind"; a "Flt Hub Out Ind"; a "Flt Hub On Ind"; a Flt Hub Crew Chg Ind"; the "Flt Latest Time Dep (Local)"; the "Overfly Cntry Code"; and the "Last Update." Generally, the "Processing Group" is a group for multiple instances of processing; the "Flt Dep Date (Local)"; the "Flt #" is the flight number; the "Flt Dep City" is the departure city; the "Flt Arr City" is the flight arrival city; the "Status" is the status of the flight; the "Direction" is either inbound or outbound from the USA; the "Flt Hub Closeout Ind" is either Y or N and indicates if the flight close out event has been received from OpsHub; the "Flt Hub Out Ind" is either Y or N and indicates if an OUT event has been received from the OpsHub data source 25a; the "Flt Hub On Ind" is either Y or N and indicates if an ON event has been received from the OpsHub data source 25a; and the Flt Hub Crew Chg Ind" indicates whether a crew change event has been received from the OpsHub data source 25a. In some embodiments, the columns referencing Flight Hub or Flt Hub instead reference OpsHub and the indicators for those columns are received from the OpsHub data source 25a.

In some embodiments and as illustrated in FIG. 23a, the Flight Tracking Table 247 is a table that contains the processing information for each country or entity that is receiving an API message for a flight. When "Flight Tracking" is selected from the "Operations" drop-down menu 65, a window 445 is displayed to the user 45 that includes the Flight Tracking Table 247. As illustrated, the Flight Tracking Table 247 includes a listing of country address records, such as records 450, 455, etc. Each record is associated with a "Type"; a "Status"; a "TTY Addr"; a "Date Time"; a "GMT Adj Mins"; a "IATA City"; the "Country Code"; the "Segment Code"; a "Send Msg Ind"; a "Close Ind"; an "Out Ind"; an "Off Ind"; an "On Ind"; an "In Ind"; a "Crew Ind"; a "Close Sent Ind"; an "Out Sent"; an "Off Sent"; an "On Sent"; an "In Sent"; a "Crew Sent"; a "Timer 1 Sent"; a "Timer 2 Sent"; a "Timer 3 Sent"; and the "Last Update". Generally, the "Type" defines the type of message to be generated and can be for a departure country ("D"), an arrival country ("A"), Airline Headquarters ("H"), and overfly country(ies) ("O"); the "Status" indicates the status of when the message was generated; the "TTY Addr" defines the primary teletype delivery address; the "Date Time" defines the data and time of flight departure or arrival, based on the "TYPE" value; the "GMT Adj Mins" is the GMT offset of the departure or arrival city; the "IATA City" is the three-character IATA city code; the "Segment Code" identifies which row in the Segment Table 210 is to be used to build the message; the "Send Msg Ind" indicates that the generated message is to be sent, with the indicator being ("N") when the message is built and saved in the APIS MSG Table and being ("Y") then the message is built, saved in the Message Table 249, OPS-TRAK and sent to the OpsHub data source 25a; the "Close Ind" is either a Y or N and indicates whether the message is to be generated when a Closeout event is posted; the "Out Ind" is either a Y or N and indicates whether the message is to be generated when an OUT event is posted; the "Off Ind" is either a Y or N and indicates whether the message is to be generated when an OFF event is posted; the "On Ind" is either a Y or N and indicates whether the message is to be generated when an ON event is posted; the "In Ind" is either a Y or N and indicates whether the message is to be generated when an IN event is posted; the "Crew Ind" is either a Y or N and indicates whether the message is to be generated when a crew change event is posted; the "Close Sent Ind" saves the date and time the closeout message was sent; the "Out Sent" saves the date and time the OUT message was sent; the "Off Sent" saves the date and time the OFF message was sent; the "On Sent" saves the date and time the ON message was sent; the "In Sent" saves the date and time the IN message was sent; the "Crew Sent" saves the date and time the crew change message was sent; the "Timer 1 Sent" saves the date and time the Timer 1 event message was sent; the "Timer 2 Sent" saves the date and time the Timer 2 event message was sent; and the "Timer 3 Sent" saves the date and time the Timer 3 event message was sent.

In some embodiments and as illustrated in FIG. 23b, multiple flight numbers may be selected from the Message Table 249 via the window 445 to be combined with multiple date selections in one search or filter request instead of making a single search for one flight to obtain the crew manifest information that is being searched. As illustrated, multiple drop-down menus 456 are used to filter or select data, with items that are included in the drop-down menu being selectable. As illustrated, the drop-down menu 456 associated with flight original date has been dropped down to reveal dates that are selectable. Generally, a flight is an event that has a flight identifier or flight number and occurs on a date and often, multiple dates. As illustrated, dates 2023 Aug. 17, 2023 Aug. 16, 2023 Aug. 15, 2023 Aug. 14, 2023 Aug. 13, 2023 Aug. 12, 2023 Aug. 11, and 2023 Aug. 10 have been selected. In some embodiments, these selected dates form a subset of dates are used as a filter to or search parameter. Similarly, the drop-down menu 456 associated with flight number is capable of being dropped-down to reveal flight numbers that are selectable. As illustrated, at least flight numbers AA0020 and AA0021 have been selected. These selected dates, flight numbers, and other selected parameters are used to create a search or filter search results. For example, the filter(s) that are selected via the drop-down menus 456 are used by APIS 35 to filter the messages generated by APIS 35 to produce a subset of messages that are associated with the filter(s). That subset of messages can then be displayed on the window 445.

Displaying the Subset of Messages, Using the Application, on a User Interface

Figure 24:
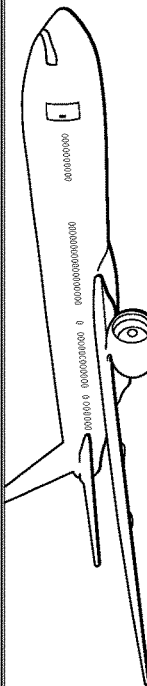

In some embodiments and as illustrated in FIG. 24, the Message Table 249 is a table that contains a list of messages generated by the APIS application 35. When "Message" is selected from the "Operations" drop-down menu 65, a window 460 is displayed to the user 45 detailing the messages that were generated by the APIS application 35, as illustrated in FIG. 24. The window 460 displays the Message or Msg Table 249, which as illustrated, includes a listing of messages, such as messages 465, 470, etc. Each message is associated with a "Status"; a "TTY Addr"; a "Ref Nbr"; a "Msg Date Time"; a "Direction"; an "Airline Code"; a "Flight #"; a "Dept Date Time"; a "Dep City"; a "Dep Cntry Code"; an "Arr Date Time"; an "Arr City"; an "Arr Cntry Code"; a "Total Crew"; an "Overfly Ind"; a "Message"; and the "Last Update". Generally, the "Status" is the status of the message; the "TTY Addr" is the teletype destination address; the "Ref Nbr" is the reference number generated by the APIS application 35; the "Msg Date Time" is the data and time the message was generated; the "Direction" is the flight direction, being inbound to the USA or outbound from the USA; the "Airline Code" is a two-character IATA airline code; the "Flight #" is a four-character flight number; the "Dept Date Time" is the flight departure date and time; the "Dep City" is the three-character IATA departure city code; the "Dep Cntry Code" is the three-character departure country code; the "Arr Date Time" is the flight arrival date and time; the "Arr City" is the three-character arrival city code; the "Arr Cntry Code" is the three-character arrival country code; the "Total Crew" is the total number of crew members on the flight; the "Overfly Ind" indicates if the message is an overfly message; and the "Message" is a link to the message.

Figure 25:
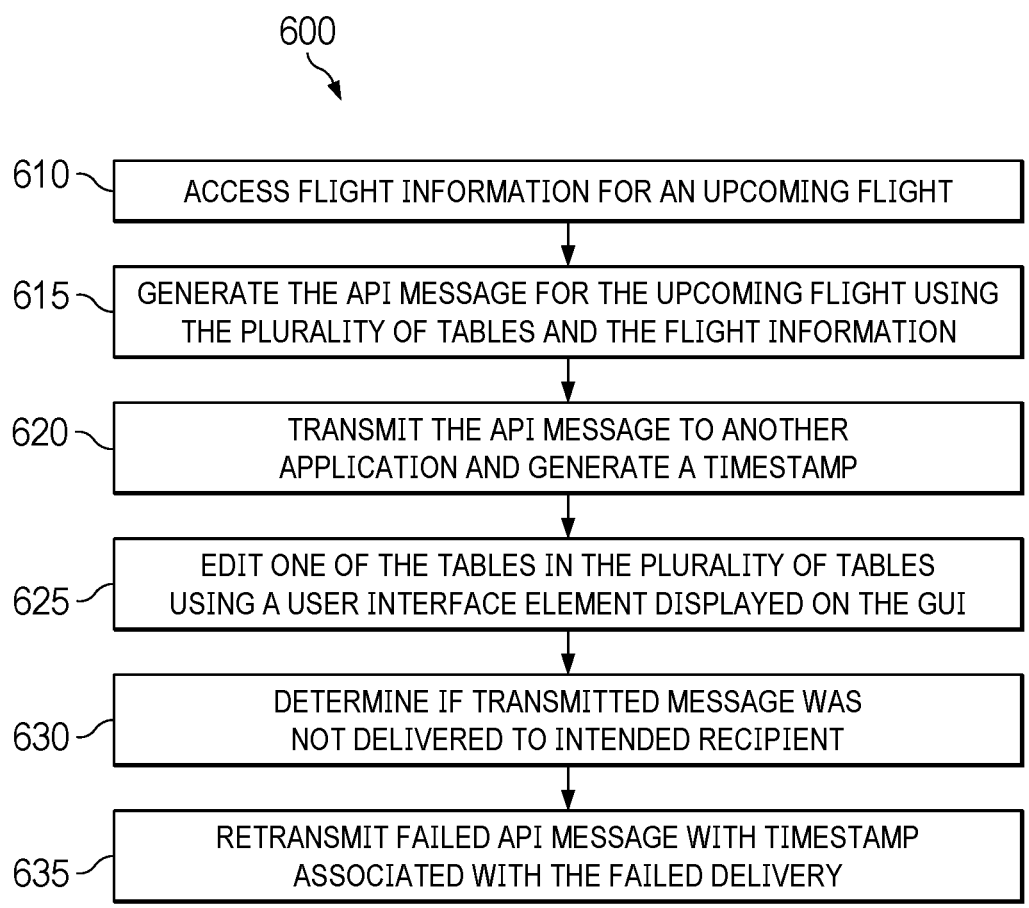
FIG. 25 is a flow chart illustration of a method of operating the system of FIG. 1, according to an example embodiment.

In an example embodiment, as illustrated in FIG. 25 with continuing reference to the previously-referenced Figures, a method 600 of operating the system 10 includes accessing flight information for an upcoming airline flight at step 610; generating the API message for the airline flight using the plurality of tables 190 and the flight information at step 615; transmitting the API message to another application and generating a time stamp for the transmission of the API message at step 620; editing one of the plurality of tables 190 using a user interface element displayed on the GUI 15a at step 625; determining if a sent API message was not delivered to its intended recipient at step 630; and retransmitting the failed API message with the timestamp associated with the failed delivery at step 635.

In some embodiments and at the step 610, flight information is accessed by the APIS application 35 for an airline flight. In some embodiments, the APIS application 35 receives the flight information when the OpsHub data source 25a publishes, as they occur, FOS flight events. In some embodiments, a record or history of checking and receiving associated with the APIS application 35 is reflected in the Event Log Table 215. In some embodiments, a record or history of the Flight Events received or accessed during the step 610 is illustrated or depicted in the Event Log Table 215. For example, as illustrated in FIG. 21, the OpsHub Event Log Table 215' includes listings for "IN", "CREW", and "OUT" flight events. As the need for the API message is based on events, the APIS application 35 monitors for triggering events during the step 610. Generally, the flight information is delivered via Message Queuing ("MQ"). In some embodiments, the APIS application 35 connects to the OpsHub data source 25a hosted queues and consumes the Flight Events. In some embodiments, the APIS application 35 retrieves crew information for a given flight, or "Crew on Flight" information from the FOS data source 25b via the OpsHub data source 25a. In some embodiments, the APIS application 35 retrieves "Crew on Flight" information by executing the FOS NSP entry via the "OpsHub Generic FOS Request" web service. The "Crew on Flight" information may include personally identifiable information ("PII") data such as Employee Name, Passport Number, Visa Number, Date of Birth, Address, Pilot License Number, etc. In some embodiments, the APIS application 35 retrieves Pilot License information from the FOS data source 25b by executing a FOS**/entry via the "OpsHub Generic FOS Request" web service. The pilot license information response includes PII relevant attributes: Airline Transport Pilot (ATP) License number and Date issued. In some embodiments, the APIS application 35 retrieves the address information via a OpsHub Crew Member Info web service. The address information response includes PII relevant attributes of address.

In some embodiments and at the step 615, the APIS application 35 generates the API message for the airline flight using the plurality of tables 190 and the flight information. Generally, the APIS application 35 generates the API message by referencing the plurality of tables 190, which provide instructions regarding the formatting, the content, the recipient address, and the target transmission time for each message.

Figure 26:
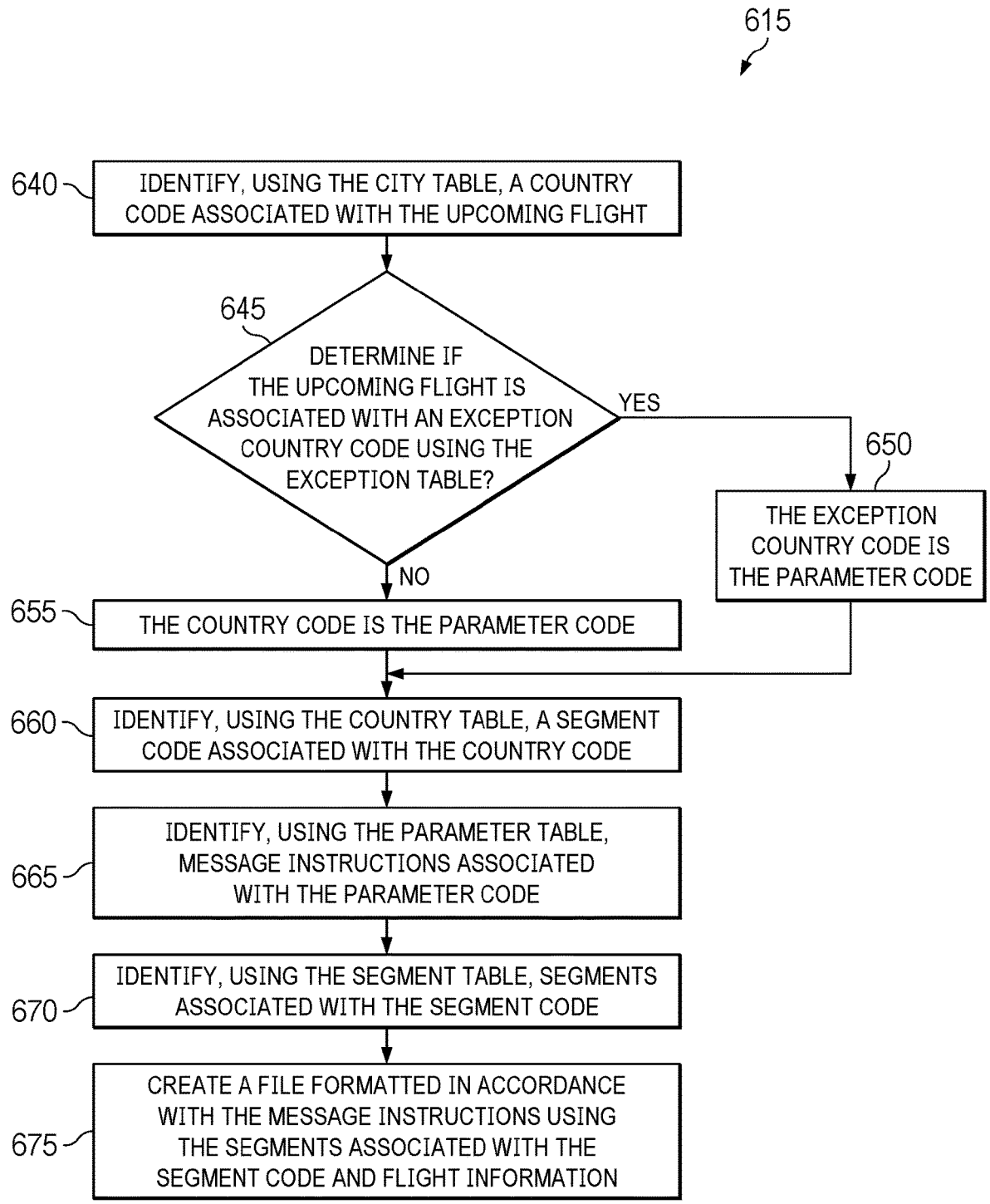
FIG. 26 is a flow chart illustration of a step of the method of FIG. 25, according to an example embodiment.

In some embodiments and as illustrated in FIG. 26, the step 615 includes identifying, using the City Table 200, a country code associated with the airline flight at step 640; determining if the airline flight is associated with an exception country code using the Exception Table 230 at step 645; if there is an exception then the exception country code is a parameter at step 650; if there is no exception then the country code is the parameter code at step 655; identifying, using the Country Table 205, a segment code associated with the country code at step 660; identifying, using the Parameter Table 245, message instructions associated with the parameter code at step 665; identifying, using the Segment Table 210, segments associated with the segment code at step 670; and creating a file formatted in accordance with the message instructions using the segments associated with the segment code and flight information at step 675.

In some embodiments and at the step 640, the APIS application 35 identifies, using the City Table 200, a country code associated with the airline flight. For example, and turning back to FIG. 21, when the APIS application 35 determines that a Flight Event of "OUT" has been identified for Flight 69, which is departing from Dublin ("DUB") and flying to Philadelphia ("PHL"), the APIS application 35 references the City Table 200 (illustrated in FIG. 11) and identifies that the country code for DUB is IRL and the country code for PHL is USA.

In some embodiments and at the step 645, the APIS application 35 determines if the airline flight is associated with an exception country code using the Exception Table 230. For example, Flight 69 is associated with a city pair of DUBPHL and the APIS application 35 references the Exception Table 230 to determine if there is an exception associated with the city pair of DUBPHL. As illustrated in FIG. 8, there is an exception associated with the city pair of DUBPHL. While the departure city parameter code remains as IRL the arrive city parameter code, or exception country code, is USA1. In some embodiments, the APIS application 35 also determines if any other exceptions are related to the airline flight. For example, the APIS application 35 may reference the Overfly City Table 240 to determine whether the city pair of DUBPHL is associated with any listings within the Overfly City Table 240. If a city pair is associated with a listing in the Overfly City Table 240, the APIS application 35 generates a message using the Overfly Country Code within the Overfly City Table 240 to generate an API message based on the Overfly Country Code. The message for the airline flight based on the Overfly Country Code may be different from the message for the airline flight based on the arrival city. Thus, the APIS application 35 is configured to generate multiple different messages for each airline flight if needed.

At the step 650 and when there is an exception, the exception country code becomes the parameter code during the method 600. That is, the APIS application 35 associates the parameter code of USA1 with the arrival city instead of USA.

At the step 655 and when there is no exception, the country code identified in the City Table 200 is the country code and the parameter code.

At the step 660, the APIS application 35 identifies, using the Country Table 205, a segment code associated with the country code.

At the step 665, the APIS application 35 identifies, using the Parameter Table 245 and based on the parameter code, message instructions associated with the parameter code. For example, the message instructions include whether the instructions apply to outbound flights, inbound flights, or both; instructions whether the crew member's alien resident information is to be included in the API message; instructions whether crew member's visa information is to be included in the API message; instructions whether the crew member's passport information is to be included in the API message; instructions re the number of minutes prior to scheduled departure to send an API message; instructions whether the crew member's home address is to be included in the API message; instructions whether crew change event will generate an API message; instructions whether a master crew list is to be included in the API message; instructions whether a closeout event will generate an API message; instructions whether an OUT event will generate an API message; instructions whether an OFF event will generate an API message; instructions whether a pilot's license information is to be included in the API message; and instructions whether the API message is to be sent.

In some embodiments and at the step 670, the APIS application 35 identifies, using the Segment Table 210 and based on the segment code, segments associated with the segment code.

In some embodiments and at the step 675, the APIS application 35 creates the API message for the airline flight using the flight information, the message instructions, and the segments associated with the segment code. For example, the APIS application 35 identifies segment templates that are associated with the segment code and, based on the segment tag and/or ordering, arranges the segments relative to each other to create the API message. Moreover, for each token that is associated with the segment templates, the appropriate flight information is substituted for the token name. In some embodiments, the APIS application 35 pulls information from the plurality of data sources 25 when substituting information in for the token names.

Returning back to FIG. 25 and at the step 620, in some embodiments the APIS application 35 transmits the API message to another application. In some embodiments, the APIS application 35 transmits the message to the OpsHub data source 25a. In some embodiments, the API message and other API messages are routed via the OpsHub data source 25a via MQ to Aeronautical Radio, Incorporate ("ARINC"). ARINC delivers the API messages as teletype messages to the countries it serves or will forward the messages to SITA for delivery to other countries. Some countries (i.e., Australia, New Zealand) do not adhere to the Electronic Data Interchange for Administration, Commerce and Transport ("EDIFACT") standard for APIS Messaging. In those instances, Flight Crew Manifest data, such as that in the API message, for flights to these countries will be delivered via a file transfer, with copies being sent to OPSTrak via OpsHub MQ. Generally, the APIS application 35 sends the API messages to the OpsHub data source 25a via MQ. The OpsHub data source 25a forwards these messages to ARINC via MQ. ARINC then delivers the messages to the destination teletype addresses which it manages. ARINC forwards messages to SITA for destination teletype addresses that SITA manages. The OpsHub data source 25a sends messages destined for some countries (i.e., Australia and New Zealand) to SITA via SSH File Transfer Protocol ("SFTP"). In some embodiments, the APIS application 35 generates a timestamp when the API message is transmitted to the another application and the timestamp is associated with the transmitted API message or becomes a part of the API message.

In some embodiments and at the step 625, the APIS application 35 is used to edit one of the Exception Table 230, the Parameter Table 245, the City Pairs Table 195, the City Table 200, the Overfly City Table 240, the Destination Address Table 235, the Country Table 205, and the Segment Table 210 via a user interface element displayed on the GUI. In some embodiments, the user 45 is an administrative user (e.g., IT. personnel) that interacts with the APIS application 35 via a browser-based interface. In some embodiments, the primary interactions include the maintenance of application parameters, such as those in the Parameter Table 245, which drive the frequency, timing, and format of messages for foreign and US customs agencies. In some embodiments, there is also the ability to view recent API messages as well as the ability for the user 45 to manually generate a message when required.

In some embodiments and at the step 630, the APIS application 35 determines if the transmitted API message failed to deliver to its intended recipient. In some embodiments, the APIS application 35 receives a request to resend the API message; receives a notification that the API message failed to send; and/or receives a notification that the API message failed to deliver. In some embodiments, the APIS application 35 queries the plurality of data sources 25 to determine if the API message failed to deliver to its intended recipient. In some embodiments, the APIS application 35 generates a Data Variance Report to determine if there are any delays in the transmission of the API messages to the another application. In some embodiments, the APIS application 35, upon determining which API messages were delayed in their transmission, automatically resends the failed messages, or the messages that were delayed in their transmission.

Figure 27:
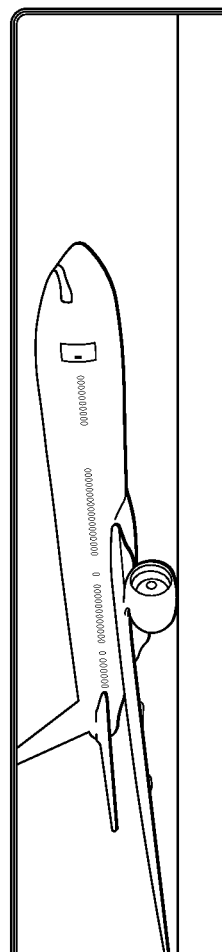

In some embodiments and at the step 635, the APIS application 35 resends the failed API message with the timestamp associated with the failed delivery attempt. In some embodiments and as illustrated in FIG. 27, instead of a "?" within the "Status" column in the Message Table 249, each listing is associated with a "Status" such as "Resend Original", "Resend Request", "OOI: OFF Event", "Timer1 (15 minutes)", etc. As illustrated in FIG. 27, the listings in the Message Table 249 are searchable and capable of being filtered via filters 700 and search box(es) 705. In some embodiments, the window 460 also includes a selectable "resend all message" button 710, which when selected, resends a selected number of messages. In some embodiments, the selected number of messages are the search results when the user 45 searches for listings via the filters 700 and/or the search box(es) 705. When the messages are resent, the APIS application 35 provides visual confirmation of the resending of the API message via changing the "Status" to "Resend Original" and the "Last Update" being updated with the time associated with the resending of the API message(s). In some embodiments, the APIS application 35 resends the API message and the associated timestamp for the previous, failed transmission. In some embodiments, the resent API message includes the timestamp of the previous, failed transmission.

In some embodiments, the method 600 also includes sending a signal to print the API message at a teletype printer. That is, the APIS application 35 sends a control signal to a teletype printer to print the API message.

Figure 28:
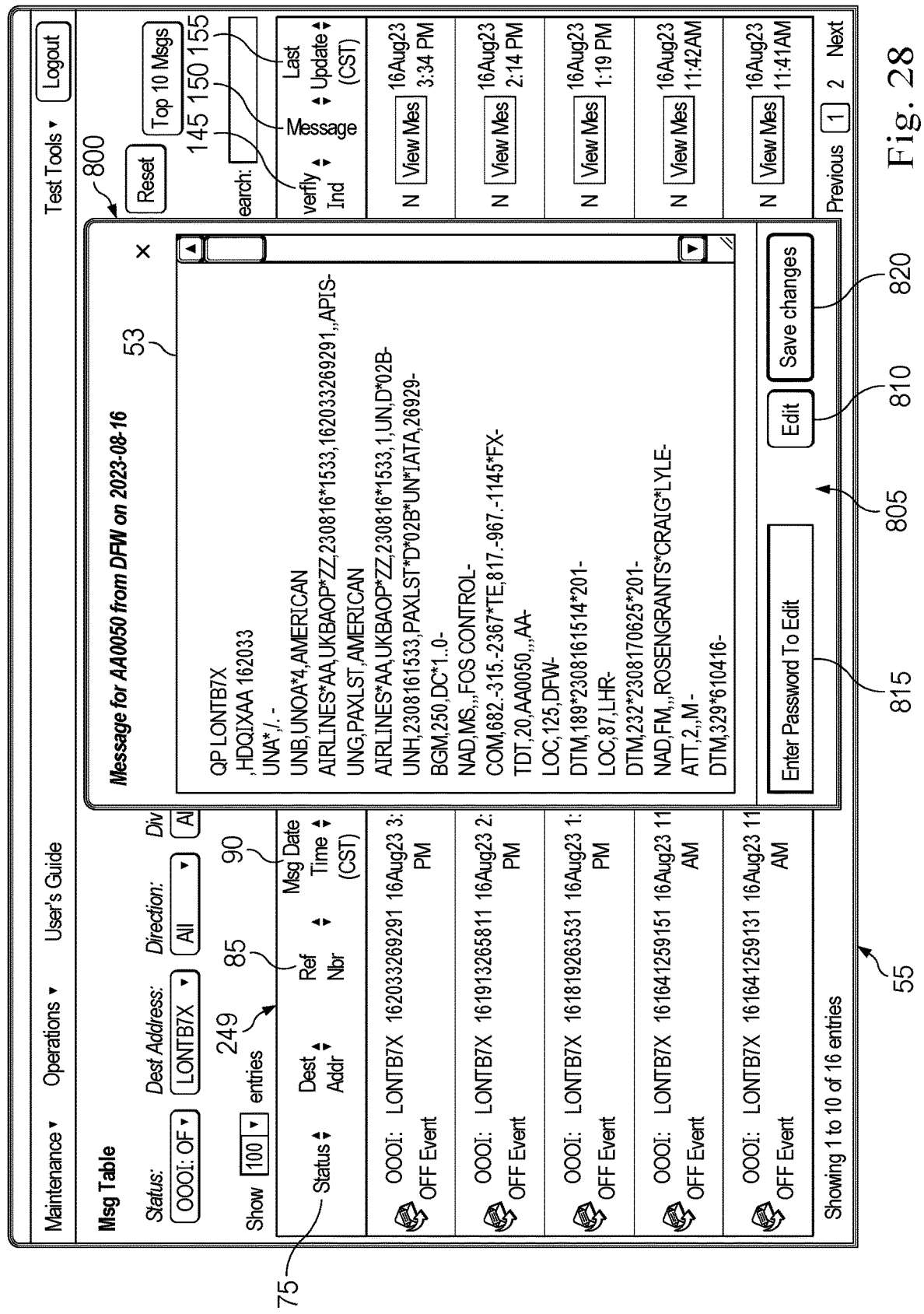

The method 600 can be altered in a variety of ways. For example, during the step 630 it may be determined if the transmitted message should be edited instead of determined if the transmitted message was not delivered to the intended recipient. When it is determined that the transmitted message should be edited or otherwise altered, during the step 635 the APIS application 35 resends the edited API message with the timestamp associated with the unedited message. In some embodiments, determining if the transmitted message should be edited includes receiving a request from a recipient to edit the message and/or identifying an error in the transmitted message. For example, and once it is determined that the transmitted message should be edited, the APIS application 35 is capable of changing a crew manifest of an already sent message from the Message Table 249. FIG. 28 illustrates the Message Table 249 and an editable API message 800 that has been selected from the listing of messages from the Message Table 249. Generally, the editable API message 800 includes the API message 53 and an editing portion 805. In the embodiment shown, the editing portion 805 includes an selectable edit button 810, a text entry box 815 configured to receive a password, and a selectable "save changes" button 820. In some embodiments, a country, entity related to a country, or intended recipient requests that a portion of the API message 53 be changed. In response, and when the API message 53 has already been sent to the recipient, a user of the application 35 can select the message from the message list in the Message Table 249 to open the editable API message 800. In some embodiments, the requested change is a requested change to a crew manifest. Once the editable API message 800 is displayed, the user can enter text, such as a password, in the text entry box 815 to start editing the API message 53. In some embodiments, entering the password and selecting the "edit" button 810 allows for the user to edit the text of the API message 53, with those edits saved once the user selects the save changes button 820. In some embodiments, and after the edits to the message are saved, the APIS application 35 changes the previously sent message to the edited version of the message. In some embodiments, the APIS application 35 sends the edited API message and the associated timestamp for the previous, unedited transmission. In some embodiments, the resent API message includes the timestamp of the previous transmission. In some embodiments and similar to the security prompt 355 for the Parameter Table 245, a security prompt is provided before the editing of any API messages.

In some embodiments and at the step 635, the APIS application 35 resends the edited API message with the timestamp associated with the unedited message. In some embodiments and as illustrated in FIG. 29, the listing of messages in the Message Table 249 are searchable and capable of being filtered via filters 700 and search box(es) 705. In some embodiments, the window 460 also includes the selectable "resend all message" button 710, which when selected, resends a selected number of messages. When the messages are resent, the APIS application 35 provides visual confirmation of the resending of the API message via the "Last Update" being updated with the time associated with the resending of the API message(s). In some embodiments, the APIS application 35 resends the API message and the associated timestamp for the previous, unedited transmission. In some embodiments, the resent API message includes the timestamp of the previous, unedited transmission.

In some embodiments, the resending of multiple API messages improves the technical field of crew or passenger manifest message transmissions. For example, with conventional systems and when messages for a flight were delayed or the messages needed correction, the user would need to hand type the message and look up the teletype printer address (e.g., recipient address) for each delayed, incorrect, or failed message. As each flight may be associated with multiple messages, the user may be required to hand type the message over 50 times or over 100 times. With the APIS application 35, the resending of the messages, either failed or corrected/changed, occurs quickly via the "resend all message" button 710. Moreover, the inclusion of the timestamp associated with the initial transmission with the edited message. Moreover, the resending of the API message with the timestamp of the previous transmission improves the technical field of crew or passenger manifest message transmission because the ability to prove that the message was sent in a timely manner, via the timestamp, can be used to avoid fines or the like for not transmitting the API message in a timely manner. As such, the APIS application 35 improves the technical field of crew or passenger manifest message transmissions.

In some embodiments, the APIS application 35 also allows for testing of the message creation and transmission for a flight. When testing, the following one or more test parameters are presented to the user 45 via the GUI 15*a* and inputs are provided via the GUI 15*a* for: Closeout Ind being either Yes or No; Crew Change Ind being either Yes or No; Out Ind being either Yes or No; Off Ind being either Yes or No; destination address(es); test timers and departure date; segment code; home address indicator, Passport Ind; Visa Ind; Alien Ind; resend being Yes or No; Pilot License Ind being Non or License Required, etc. In some embodiments, the testing ability of the APIS application 35 results in the ability to change message formats and test a new country in a few hours (e.g., less than 4 hours) instead of a few weeks as in common in conventional systems. Moreover, the testing ability of the APIS application 35 results in the ability to test an APIS country transmission with ARINC, which with conventional systems is not possible. Generally, the testing ability of the APIS application 35 allows for the user 45 to test on demand instead of waiting for the appropriate pre-departure alert, which could occur at a much later time.

In some embodiments, the APIS application 35 transforms the format of the API message from a teletype format to a file transfer. In some embodiments, the APIS application 35 creates the API message using a file format such as a comma separate value ("CSV") file.

In some embodiments, the APIS application 35 provides an alert when a crewmember passport is close to expiring or within a predetermined period of time before expiring. Generally, the purpose of the alert is to alert a Flight Service teams if the crewmember is not qualified to fly an upcoming flight that they are scheduled to fly until their passport is renewed. In some embodiments, the FOS data source 25*b* via the OpsHub data source 25*a* comprises the passport expiration dates for crew members. In some embodiments, the APIS application 35 retrieves passport expiration dates for crew members by executing the FOS NSP entry via the "OpsHub Generic FOS Request" web service. In some embodiments, the APIS application 35 retrieves or accesses passport expiration dates on a regular and/or periodic basis to identify, based on the passport expiration dates, passport expiration dates that are within a time threshold. In some embodiments, the time threshold is a predetermined period of days before the expiration date of the passport. For example, the APIS application 35 generates an alert indicating that a number of passports associated with crew members or potential crew members are expected to expire within 7 days, within 14 days, within 1 day, etc. In other embodiments, the APIS 35 retrieves or accesses passport expiration dates when generating a crew manifest for an upcoming flight and indicates which, if any, members of the crew will have expired passports prior to the departure date of the flight to which they are expected to crew and for which the crew manifest is being generated. Generally, providing an alert provides another mechanism of automation to save having to cancel a flight because a replacement crewmember could not be found in time to fly the scheduled route on time.

In some embodiments, the APIS application 35 is capable of illustrating which flights are categorized as "Diverted" and are in the Message Table 249 and the OpsHub Event Log Table 215'. FIG. 30 illustrates one embodiment of the OpsHub Event Log Table 215' displayed in the window 415. The window 415 displays the OpsHub Event Log Table 215', which as illustrated, can be filtered using drop-down filters 900, 905, 910, 915, and 920 for example. As illustrated, drop-down filter 900 includes a classification of a type of flight event, such as "Diversion"; drop-down filter 905 includes a drop-down list of potential flight numbers; drop-down filter 910 includes a drop-down list of dates; drop-down filter 915 includes a drop-down list of departure cities; and drop-down filter 920 includes a drop-down list of arrival cities. While drop-down filters that include drop-down lists are illustrated here, a variety of filter mechanisms are contemplated here such as other expandable filter options. Moreover, any filters can also be used as search terms and the action of filtering to identify a subset of messages is similar, if not identical to, the action of searching to display a subset of messages.

In several exemplary embodiments, the system 10 includes an arrangement of elements that is a technical improvement over the previous ways of generating and transmitting crew manifest records or messages. The system 10 is a technical solution to problems associated with the generation and transmission crew manifest records or messages using conventional systems. Specifically, the ability to monitor for failed transmissions of messages, the ability to send an edited message with the timestamp associated with a previously-sent message, the ability to resend a plurality of messages simultaneously, the ability to test transmission of a message, and the ability to change the instructions for message generation without changing the code of the APIS application 35 addresses the problems of single message generation, single message transmission, and the requirement of changing code of an application to change the message instructions that are associated with conventional systems. Moreover, the APIS application 35 enforces a layer of input validation (e.g., use of last update) and controls to result in faster and more efficient message generation and transmission. In an exemplary embodiment, the APIS application 35 interfaces with the plurality of data sources 25 to increase the accuracy and timeliness of API messages. As such, the system 10 and/or the method 600 involve a practical application of generation and transmission of crew manifest records or messages.

In an example embodiment, the use of a table-driven database via the plurality of tables 190 reduces the amount of code, compared to conventional systems, needed to generate and transmit the API messages. Reducing the amount of code being stored and executed on the computer decreases the processing load on the computer 30. Reducing the processing load of the computer 30 improves the performance of the computer 30 such that available memory of the computer 30 is increased, the processing capacity of the computer 30 is increased, and the processing speed of the computer 30 is increased.

Figure 31:
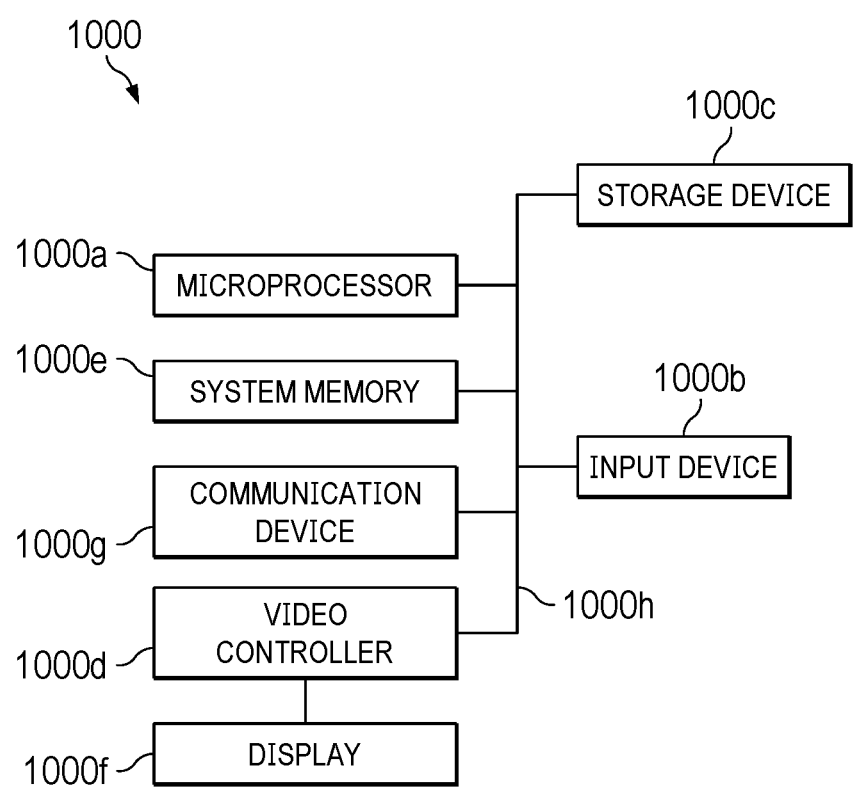
FIG. 31 is a diagrammatic illustration of a computing device, or node, for implementing one or more example embodiments of the present disclosure, according to an example embodiment.

In an example embodiment, as illustrated in FIG. 31 with continuing reference to FIGS. 1-13, 14a, 14b, 15, 16a-16e, 17a, 17b, and 18-22, 23a, 23b, and 24-30, an illustrative node 1000 for implementing one or more of the example embodiments described above and/or illustrated in FIGS. 1-13, 14a, 14b, 15, 16a-16e, 17a, 17b, and 18-22, 23a, 23b, and 24-30 is depicted. The node 1000 includes a microprocessor 1000a, an input device 1000b, a storage device 1000c, a video controller 1000d, a system memory 1000e, a display 1000f, and a communication device 1000g, all interconnected by one or more buses 1000h. In several example embodiments, the storage device 1000c may include a hard drive, CD-ROM, optical drive, any other form of storage device and/or any combination thereof. In several example embodiments, the storage device 1000c may include, and/or be capable of receiving, a CD-ROM, DVD-ROM, or any other form of computer-readable medium that may contain executable instructions. In several example embodiments, the communication device 1000g may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones, and cell phones.

In several example embodiments, one or more of the components of the systems described above and/or illustrated in FIGS. 1-13, 14a, 14b, 15, 16a-16e, 17a, 17b, and 18-22, 23a, 23b, and 24-30 include at least the node 1000 and/or components thereof, and/or one or more nodes that are substantially similar to the node 1000 and/or components thereof. In several example embodiments, one or more of the above-described components of the node 1000, the system 10, and/or the example embodiments described above and/or illustrated in FIGS. 1-13, 14a, 14b, 15, 16a-16e, 17a, 17b, and 18-22, 23a, 23b, and 24-30 include respective pluralities of same components.

In several example embodiments, one or more of the applications, systems, and application programs described above and/or illustrated in FIGS. 1-13, 14a, 14b, 15, 16a-16e, 17a, 17b, and 18-22, 23a, 23b, and 24-30 include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous Javascript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices, and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions is stored on a non-transitory computer readable medium and are executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000a, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure. For example, instead of, or in addition to, transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries.

The present disclosure introduces a method of generating a passenger information message, the method comprising: accessing, using an application, flight information for an airline flight; wherein the flight information comprises: a city pair for the airline flight; wherein the city pair is associated with two cities; and passenger information for passengers associated with the airline flight; accessing, using the application, a first table to identify a first country code associated with at least one of the two cities; accessing, using the application, a second table to identify a segment code associated with the first country code; accessing, using the application, a third table to identify message content instructions associated with the segment code; identifying, using the application, a parameter code associated with the first country code; accessing, using the application, a fourth table to identify message delivery instructions associated with the parameter code; generating the passenger information message using the application, the flight information, the message delivery instructions, and the message delivery instructions; wherein the passenger information message comprises information formatted in accordance with the message instructions; and electronically transmitting, using the application, the passenger information message to another application. In some embodiments, the message delivery instructions comprise: instructions regarding whether the passenger information message is generated for flights that are international inbound flights, international outbound flights, or for both international inbound flights and international outbound flights; instructions regarding whether an ON event triggers the generation of the passenger information message; instructions regarding whether an OFF event triggers the generation of the passenger information message; instructions regarding whether an OUT event triggers the generation of the passenger information message; instructions regarding whether an IN event triggers the generation of the passenger information message; and instructions regarding a target transmission time prior to a scheduled departure of the airline flight; wherein the message content instructions comprise instructions regarding whether passport information for the passengers is included in the passenger information message; and wherein electronically transmitting, using the application, the passenger information message to another application comprises transmitting the passenger information message to another application at the target transmission time. In some embodiments, the segment code is one of a plurality of segment codes; wherein the third table comprises a listing of a plurality of message segments; wherein each message segment in the listing of the plurality of message segments is associated with a segment code of the plurality of segment codes; wherein each message segment in the listing of the plurality of message segments comprises a position identifier, template text, and a token name from a plurality of token names; wherein the position identifier identifies the position of the message segment in relation to other message segments that form the message; wherein the token name is associated with a portion of the passenger information to be paired with the message segment; and wherein the template text is identifying text used to identify the portion of the passenger information to be paired with the message segment; wherein accessing, using the application, the third table to identify message content instructions associated with the segment code comprises identifying a first plurality of message segments associated with the segment code; and wherein generating the passenger information message using the application, the flight information, the message delivery instructions, the message delivery instructions, and the passenger information message for the airline flight; comprises: creating a file that includes the template text for each message segment of the first plurality of message segments, wherein the template text is positioned based on the position identifiers; and substituting, using the application, the token names for the portions of the passenger information to be paired with each message segment. In some embodiments, the method also includes editing at least one of the first table, the second table, the third table, and the fourth table using a user interface element displayed on a graphical user interface. In some embodiments, at least one table of the first table, the second table, the third table, and the fourth table is mapped to another of the first table, the second table, the third table, and the fourth table. In some embodiments, the method also includes creating a timestamp, using the application, for the passenger information message when the passenger information message is transmitted to an intended recipient via the another application; determining that the passenger information message failed to reach the intended recipient; and retransmitting to the intended recipient via the another application, using the application, the failed passenger information message and its respective timestamp associated with the failed transmission of the failed passenger information message. In some embodiments, the method also includes sending a signal, using the application, to print the passenger information message via a teletype printer. In some embodiments, a format of the file is teletype. In some embodiments, the message delivery instructions include instructions to convert the format of the file from teletype to another format before transmitting the passenger information message to the another application.

The present disclosure also introduces an table-driven method of generating a passenger information message for each flight in a plurality of flights, wherein the method comprises: displaying, via an application and user interface elements displayed on a graphical user interface, a plurality of tables, with at least one table from the plurality of tables being mapped to another table from the plurality of tables; wherein a first table in the plurality of tables associates a city pair associated with a flight with a country identifier; wherein a second table in the plurality of tables associates the country identifier with a segment code; wherein a third table in the plurality of tables associates the country identifier with a plurality of message instructions; wherein a fourth table in the plurality of tables associates the segment code with a plurality of message segments paired with token names; wherein the first table is mapped to the second table; and wherein the second table is mapped to the third table and the fourth table; accessing, via the application, flight information for each flight in the plurality of flights; wherein the flight information for each flight includes the city pair for each flight and passenger information for each flight; and generating, via the application, a first file for a first passenger information message for a first flight in the plurality of flights comprising: referencing the first table to identify a first country identifier associated with the first flight; referencing the second table to identify a first segment code associated with the first country identifier; referencing the third table to identify a first plurality of message instructions associated with the first country identifier; referencing the fourth table to identify a first plurality of message segments associated with the first segment code; wherein the first plurality of message segments is paired with token names; substituting the token names with a portion of the passenger information associated with the first flight; arranging the first plurality of message segments and the portion of the passenger information that substituted for the token names in the first file to generate the first passenger information message. In some embodiments, the method also includes updating, via the application and the user interface elements displayed on the graphical user interface, at least one message instruction from the plurality of message instructions in the third table using a checkbox button displayed on the graphical user interface. In some embodiments, the updating of the at least one message instruction from the plurality of message instructions in the third table using the checkbox button displayed on the graphical user interface updates future passenger information messages associated with flights associated with the first country identifier.

The present disclosure also introduces an apparatus for generating a passenger information message, the apparatus comprising: a non-transitory computer readable medium having stored thereon a plurality of instructions, wherein when the instructions are executed with at least one processor, the following steps are executed: accessing flight information for an airline flight; wherein the flight information comprises: a flight city pair that is associated with two cities; and passenger information for passengers associated with the airline flight; and accessing a first table to identify a first country code associated with at least one of the two cities; accessing a second table to identify a segment code associated with the first country code; accessing a third table to identify message content instructions associated with the segment code; identifying a parameter code associated with the first country code; accessing a fourth table to identify message delivery instructions associated with the parameter code; generating the passenger information message using the flight information, the message delivery instructions, the message delivery instructions, and the passenger information message for the airline flight; wherein the passenger information message comprises information formatted in accordance with the message instructions; and electronically transmitting the passenger information message to an application. In some embodiments, the message delivery instructions comprise: instructions regarding whether the passenger information message is generated for flights that are international inbound flights, international outbound flights, or for both international inbound flights and international outbound flights; instructions regarding whether an ON event triggers the generation of the passenger information message; instructions regarding whether an OFF event triggers the generation of the passenger information message; instructions regarding whether an OUT event triggers the generation of the passenger information message; instructions regarding whether an IN event triggers the generation of the passenger information message; and instructions regarding a target transmission time prior to a scheduled departure of the airline flight; wherein the message content instructions comprise instructions regarding whether passport information for the passengers is included in the passenger information message; and wherein when electronically transmitting the passenger information message to another application comprises transmitting the passenger information message to another application at the target transmission time. In some embodiments, the segment code is one of a plurality of segment codes; wherein the third table comprises a listing of a plurality of message segments; wherein each message segment in the listing of the plurality of message segments is associated with a segment code of the plurality of segment codes; wherein each message segment in the listing of the plurality of message segments comprises a position identifier, template text, and a token name from a plurality of token names; wherein the position identifier identifies the position of the message segment in relation to other message segments that form the message; wherein the token name is associated with a portion of the passenger information to be paired with the message segment; and wherein the template text is identifying text used to identify the portion of the passenger information to be paired with the message segment; wherein accessing the third table to identify message content instructions associated with the segment code comprises identifying a first plurality of message segments associated with the segment code; and wherein generating the passenger information message using the flight information, the message delivery instructions, the message delivery instructions, and the passenger information message for the airline flight; comprises: creating a file that includes the template text for each message segment of the first plurality of message segments, wherein the template text is positioned based on the position identifiers; and substituting the token names for the portions of the passenger information to be paired with each message segment. In some embodiments, when the instructions are executed with at least one processor, the following steps are also executed: editing at least one of the first table, the second table, the third table, and the fourth table using a user interface element displayed on a graphical user interface. In some embodiments, at least one table of the first table, the second table, the third table, and the fourth table is mapped to another of the first table, the second table, the third table, and the fourth table. In some embodiments, when the instructions are executed with at least one processor, the following steps are also executed: creating a timestamp for the passenger information message when the passenger information message is transmitted to an intended recipient via the another application; determining that the passenger information message failed to reach the intended recipient; and retransmitting to the intended recipient via the another application the failed passenger information message and its respective timestamp associated with the failed transmission of the failed passenger information message. In some embodiments, a format of the file is teletype. In some embodiments, the message delivery instructions include instructions to convert the format of the file from teletype to another format before transmitting the passenger information message to the another application.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112 (f) for any limitations of any of the claims herein, except for those in which the claim expressly uses the word "means" together with an associated function.

What is claimed is:

1. A method of generating a message, the method comprising:
   accessing, using an application executed by one or more computers, information related to the message;
   accessing, using the application, a first table;
   identifying, using the application and the first table, a segment code associated with the information related to the message;
   accessing, using the application, a second table;
   identifying, using the application and the second table, message content instructions associated with the segment code;
   accessing, using the application, a third table;
   identifying, using the application and the third table, message delivery instructions based on the segment code;
   generating the message using the application, the segment code, the message content instructions, and the message delivery instructions;
      wherein the message comprises information formatted in accordance with the message delivery instructions;
   electronically transmitting, using the application, the message to another application;
   creating a first timestamp, using the application, for the message when the message is transmitted to an intended recipient via the another application; and
   retransmitting, using the application, the message and the first timestamp to the intended recipient via the another application.

2. The method of claim 1, further comprising:
   editing, using the application, the message;
   wherein retransmitting, using the application, the message and the first timestamp to the intended recipient via the another application comprises retransmitting the edited message.

3. The method of claim 2, wherein the message comprises a crew manifest.

4. The method of claim 1, further comprising:
   accessing, using the application, passport expiration dates for crew members;
   identifying, based on the passport expiration dates and using the application, a first passport expiration date that is within a time threshold; and
   generating, using the application, an alert when the first passport expiration date is within the time threshold.

5. The method of claim 4,
   wherein the message comprises a crew manifest of a crew associated with a flight having a departure date;
   wherein the first passport expiration date is associated the crew; and
   wherein the time threshold is a period of time prior to the departure date of the flight.

6. A method, comprising:
   generating a plurality of messages and using an application executed on one or more computers, comprising:
      accessing, using the application, information related to each message in the plurality of messages;
      accessing, using the application, a first table;
      identifying, using the application and the first table, a segment code associated with the information related to each message;
      accessing, using the application, a second table;
      identifying, using the application and the second table, message content instructions associated with the segment codes;
      accessing, using the application, a third table;
      identifying, using the application and the third table, message delivery instructions based on the segment codes;
      generating the plurality of messages using the application, the segment codes, the message content instructions, and the message delivery instructions;
         wherein each message in the plurality of messages comprises information formatted in accordance with the message delivery instructions;

electronically transmitting, using the application, the plurality of messages to one or more other applications;
filtering the plurality of messages, using the application and a filter, to produce a subset of messages associated with the filter; and
displaying the subset of messages, using the application, on a user interface.

7. The method of claim 6,
wherein each message in the plurality of messages is associated with an event that occurs on a date;
wherein each event is associated with one event identifier from a plurality of event identifiers;
wherein the events associated with the plurality of messages occur on a plurality of dates;
wherein the filter comprises:
an event identifier; and
a subset of dates from the plurality of dates; and
wherein the subset of messages comprises messages associated with the event identifier that occurs on one of the dates of the subset of dates.

8. The method of claim 7, wherein the event is a flight and the event identifier is a flight number.

9. The method of claim 6,
wherein each message in the plurality of messages is associated with an event;
wherein each event is associated with one classification from a plurality of event classifications;
wherein the filter comprises a first classification from the plurality of event classifications; and
wherein the subset of messages comprises messages associated with events associated with the first classification.

10. The method of claim 9, wherein the event is a flight and the classification is diversion.

11. An apparatus for generating a message, the apparatus comprising:
a non-transitory computer readable medium; and
a plurality of instructions stored on the non-transitory computer readable medium,
wherein when the instructions are executed with at least one processor, the following steps are executed:
accessing information related to the message;
accessing a first table;
identifying, using the first table, a segment code associated with the information related to the message;
accessing a second table;
identifying, using the second table, message content instructions associated with the segment code;
accessing a third table;
identifying, using the third table, message delivery instructions based on the segment code;
generating the message using, the segment code, the message content instructions, and the message delivery instructions;
wherein the message comprises information formatted in accordance with the message delivery instructions;
electronically transmitting the message to another application;
creating a first timestamp for the message when the message is transmitted to an intended recipient via the another application; and
retransmitting the message and the first timestamp to the intended recipient via the another application.

12. The apparatus of claim 11, wherein when the instructions are executed with the at least one processor, the following step is also executed:

editing the message;
wherein retransmitting the message and the first timestamp to the intended recipient via the another application comprises retransmitting the edited message.

13. The apparatus of claim 12, wherein the message comprises a crew manifest.

14. The apparatus of claim 11, wherein when the instructions are executed with the at least one processor, the following steps are also executed:
accessing passport expiration dates for crew members;
identifying, based on the passport expiration dates, a first passport expiration date that is within a time threshold; and
generating an alert when the first passport expiration date is within the time threshold.

15. The apparatus of claim 14,
wherein the message comprises a crew manifest of a crew associated with a flight having a departure date;
wherein the first passport expiration date is associated the crew; and
wherein the time threshold is a period of time prior to the departure date of the flight.

16. An apparatus comprising:
a non-transitory computer readable medium; and
a plurality of instructions stored on the non-transitory computer readable medium,
wherein when the instructions are executed with at least one processor, the following steps are executed:
generating a plurality of messages comprising:
accessing information related to each message in the plurality of messages;
accessing a first table;
identifying, using the first table, a segment code associated with the information related to each message;
accessing a second table;
identifying, using the second table, message content instructions associated with the segment codes;
accessing a third table;
identifying, using the third table, message delivery instructions based on the segment codes;
generating the plurality of messages using the segment codes, the message content instructions, and the message delivery instructions;
wherein each message in the plurality of messages comprises information formatted in accordance with the message delivery instructions;
electronically transmitting the plurality of messages to one or more other applications;
filtering the plurality of messages, using a filter, to produce a subset of messages associated with the filter; and
displaying the subset of messages on a user interface.

17. The apparatus of claim 16,
wherein each message in the plurality of messages is associated with an event that occurs on a date;
wherein each event is associated with one event identifier from a plurality of event identifiers;
wherein the events associated with the plurality of messages occur on a plurality of dates;
wherein the filter comprises:
an event identifier; and
a subset of dates from the plurality of dates; and
wherein the subset of messages comprises messages associated with the event identifier that occurs on one of the dates of the subset of dates.

18. The apparatus of claim 17, wherein the event is a flight and the event identifier is a flight number.

19. The apparatus of claim 16,
wherein each message in the plurality of messages is associated with an event;
wherein each event is associated with one classification from a plurality of event classifications;
wherein the filter comprises a first classification from the plurality of event classifications; and
wherein the subset of messages comprises messages associated with events associated with the first classification.

20. The apparatus of claim 19, wherein the event is a flight and the classification is diversion.

\* \* \* \* \*